(12) United States Patent
Chamoun

(10) Patent No.: US 11,673,502 B2
(45) Date of Patent: Jun. 13, 2023

(54) LOCK MECHANISM

(71) Applicant: T.C. DEVELOPMENT & DESIGN, INC., Cortland, IL (US)

(72) Inventor: Teffy R. Chamoun, Sycamore, IL (US)

(73) Assignee: T.C. Development & Design, Inc., Cortland, IL (US)

( * ) Notice: Subject to any disclaimer, the term of this patent is extended or adjusted under 35 U.S.C. 154(b) by 0 days.

(21) Appl. No.: 17/663,471

(22) Filed: May 16, 2022

(65) Prior Publication Data

US 2022/0332239 A1 Oct. 20, 2022

Related U.S. Application Data

(63) Continuation of application No. 16/424,213, filed on May 28, 2019, now Pat. No. 11,358,507, which is a continuation-in-part of application No. 16/157,397, filed on Oct. 11, 2018, now abandoned, which is a continuation of application No. 14/695,793, filed on Apr. 24, 2015, now abandoned.

(60) Provisional application No. 61/984,362, filed on Apr. 25, 2014.

(51) Int. Cl.
    *B60P 1/43* (2006.01)
(52) U.S. Cl.
    CPC .................... *B60P 1/43* (2013.01)
(58) Field of Classification Search
    CPC . B60P 1/42; F16C 11/10; B65G 69/28; B65G 69/2811; B65G 69/2823; B65G 69/2841
    See application file for complete search history.

(56) References Cited

U.S. PATENT DOCUMENTS

| | | | | |
|---|---|---|---|---|
| 1,631,355 A * | 6/1927 | Baldwin | ................ | A47B 29/00 248/295.11 |
| 3,627,244 A * | 12/1971 | Nicholas | ............... | A61J 9/0638 248/103 |
| 4,081,117 A * | 3/1978 | Crane | ........................ | B62J 9/23 224/430 |
| 4,083,511 A * | 4/1978 | Ikesue | ................... | B60R 22/405 242/383.4 |
| 4,141,524 A * | 2/1979 | Corvese, Jr. | .............. | F16L 3/00 5/503.1 |
| 4,343,058 A * | 8/1982 | Loblick | .............. | B65G 69/2823 14/71.7 |
| 4,995,130 A * | 2/1991 | Hahn | ........................ | B66F 7/08 14/71.3 |
| 5,094,583 A | 3/1992 | Bills, Jr. et al. | | |

(Continued)

FOREIGN PATENT DOCUMENTS

| | | | |
|---|---|---|---|
| DE | 4339921 A1 * | 5/1995 | ......... B65G 69/2841 |
| GB | 2 168 674 A | 6/1986 | |

(Continued)

*Primary Examiner* — Theodore V Adamos
(74) *Attorney, Agent, or Firm* — Husch Blackwell LLP

(57) ABSTRACT

A lock mechanism is disclosed herein that can be used to lockingly secure and release sections of an apparatus relative to one another. The lock mechanism can lockingly secure the sections of the apparatus relative to one another in a plurality of different positions and, when released or unlocked, can allow the sections of the apparatus to rotate relative to one another and to different ones of the plurality of different positions.

20 Claims, 20 Drawing Sheets

(56) References Cited

U.S. PATENT DOCUMENTS

| | | | | |
|---|---|---|---|---|
| 5,111,546 | A | * | 5/1992 | Hahn .................. B65G 69/2823 14/71.3 |
| 5,410,779 | A | * | 5/1995 | Esman ...................... E05D 3/14 16/370 |
| 5,460,460 | A | * | 10/1995 | Alexander .............. B66F 7/065 14/71.3 |
| 5,667,268 | A | | 9/1997 | Bump |
| 5,832,554 | A | * | 11/1998 | Alexander ......... B65G 69/2841 14/71.3 |
| 5,839,214 | A | * | 11/1998 | Peterson ................ B44D 3/185 160/374.1 |
| 5,987,704 | A | * | 11/1999 | Tang ..................... G06F 1/1681 16/342 |
| 6,176,043 | B1 | * | 1/2001 | Gibbs ..................... E06B 11/04 52/223.6 |
| D443,196 | S | * | 6/2001 | Sosa .......................... B62J 9/23 D8/323 |
| 6,574,837 | B2 | * | 6/2003 | Jantschek ............. E04B 2/7431 292/DIG. 17 |
| 7,001,132 | B2 | * | 2/2006 | Koretsky ................ B60P 1/433 414/921 |
| 7,168,722 | B1 | | 1/2007 | Piotrowski et al. |
| 7,658,587 | B1 | * | 2/2010 | Dierks .................... B60P 3/066 296/184.1 |
| 8,123,455 | B2 | | 2/2012 | Chamoun |
| 8,136,868 | B2 | | 3/2012 | Nusbaum |
| 8,813,290 | B1 | * | 8/2014 | Morris .................. B66B 9/0869 14/71.3 |
| 8,826,495 | B2 | * | 9/2014 | Jauvtis ................. G06F 1/1681 16/225 |
| 9,918,557 | B2 | * | 3/2018 | Baumeister ............ A47C 7/506 |
| 9,938,094 | B1 | * | 4/2018 | Leum ................ B65G 69/2841 |
| 10,329,819 | B1 | * | 6/2019 | Weldon ................. E05F 1/1215 |
| 10,655,383 | B2 | * | 5/2020 | Turner .................. E06B 9/0669 |
| 10,759,323 | B1 | | 9/2020 | Harms et al. |
| D924,667 | S | * | 7/2021 | Parks ........................ B60P 1/43 D8/354 |
| 11,053,720 | B1 | * | 7/2021 | Marick ..................... E05D 3/14 |
| 11,358,507 | B2 | * | 6/2022 | Chamoun ................. B60P 1/43 |
| 2004/0117927 | A1 | * | 6/2004 | Gleason ............. B65G 69/2835 14/71.3 |
| 2006/0133915 | A1 | | 6/2006 | Day |
| 2007/0045993 | A1 | | 3/2007 | Jager |
| 2008/0093886 | A1 | | 4/2008 | Nusbaum |
| 2010/0032918 | A1 | | 2/2010 | Chamoun |
| 2011/0047725 | A1 | * | 3/2011 | Story ................. B65G 69/2841 14/71.3 |
| 2012/0204360 | A1 | * | 8/2012 | Chamoun ........... B62D 63/061 14/71.3 |
| 2013/0136567 | A1 | | 5/2013 | Hambardzumyan |
| 2015/0074925 | A1 | | 3/2015 | Levi |
| 2015/0308491 | A1 | | 10/2015 | Chamoun |
| 2016/0096464 | A1 | | 4/2016 | Robertson |
| 2016/0137117 | A1 | | 5/2016 | Parrish |
| 2016/0144759 | A1 | | 5/2016 | DiBlasio et al. |
| 2016/0297344 | A1 | | 10/2016 | Hambardzumyan |
| 2020/0346700 | A1 | | 11/2020 | Nordstrom |
| 2021/0039542 | A1 | * | 2/2021 | White ..................... B60P 1/435 |
| 2021/0039543 | A1 | | 2/2021 | Walker et al. |

FOREIGN PATENT DOCUMENTS

| | | | | |
|---|---|---|---|---|
| GB | 2168674 | A | * 6/1986 | .............. B64C 1/22 |
| GB | 2551158 | A | * 12/2017 | ................ B60P 1/43 |
| GB | 2551158 | A | 12/2017 | |
| WO | WO-0107716 | A1 | * 2/2001 | ......... B65G 69/2823 |
| WO | WO-2017129140 | A1 | * 8/2017 | ............ E05D 15/26 |

* cited by examiner

LOCK MECHANISM

CROSS-REFERENCE TO RELATED APPLICATIONS

This application is a continuation of U.S. patent application Ser. No. 16/424,213, filed May 28, 2019, titled "Lock Mechanism", which is a continuation-in-part of U.S. patent application Ser. No. 16/157,397, filed Oct. 11, 2018, titled "Lock Mechanism,", which is a continuation of U.S. patent application Ser. No. 14/695,793, filed Apr. 24, 2015, titled "Lock Mechanism,", which claims the benefit of U.S. Provisional Patent Application No. 61/984,362, filed Apr. 25, 2014, titled "Lock Mechanism." U.S. patent application Ser. Nos. 16/424,213, 16/157,397, 14/695,793, and 61/984,362 are hereby incorporated by reference.

FIELD

The present invention relates generally to lock mechanisms. More particularly, the present invention relates to a lock mechanism that can be used to lockingly secure and release sections of a device relative to one another, wherein the device can adopt different positions for functioning as a ramp, a trailer, or a transportation system for recreational vehicles, such as motorcycles.

BACKGROUND

U.S. Pat. No. 8,123,455 titled "Loading Ramp and Trailer" and granted Feb. 28, 2012 discloses a loading ramp and trailer. U.S. Pat. No. 8,123,455 is owned by the owner hereof and is hereby incorporated by reference. Specifically, U.S. Pat. No. 8,123,455 discloses an apparatus that can function as a ramp in one position and as a trailer in another position. The apparatus includes a plurality of sections that can rotate relative to one another and can be secured relative to one another in a plurality of positions. For example, the apparatus and the plurality of sections thereof can be moved into a loading one of the plurality of positions to function as a ramp, into a trailing one of the plurality of positions to function as a trailer, and into a transporting one of the plurality of positions, which is different from the loading one of the plurality of positions and the trailing one of the plurality of positions. In each of the plurality of positions, the plurality of sections of the apparatus can be locked in a respective one the plurality of positions relative to one another. However, to move between the plurality of positions, the plurality of sections of the apparatus can be released so that they can rotate relative to one another.

In view of the above, an improved lock mechanism that can be used to lockingly secure and release the plurality of sections of the apparatus relative to one another is desired.

DETAILED DESCRIPTION

Figure 1:
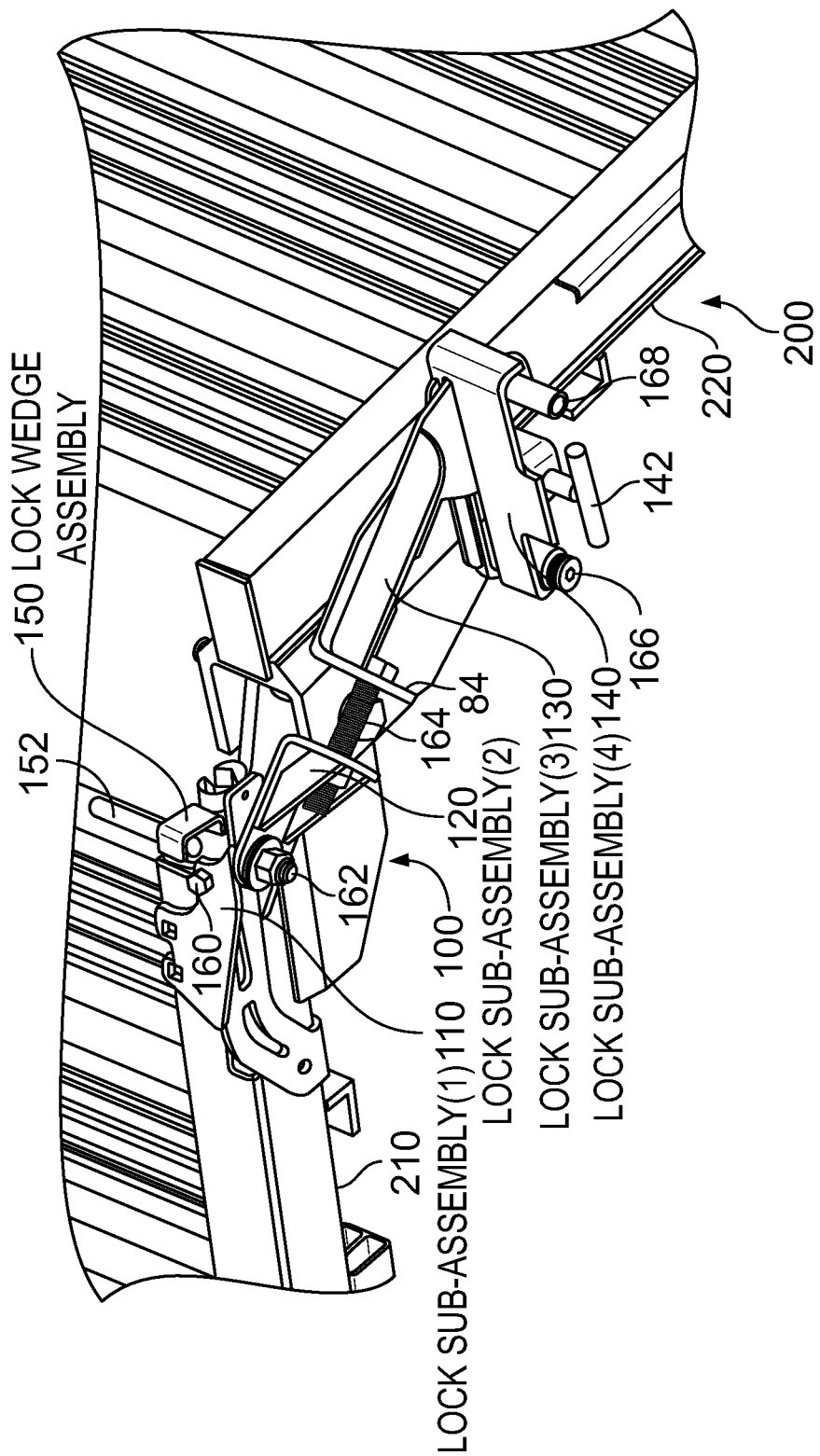
FIG. 1 is a top perspective view of a lock mechanism in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include a lock mechanism that can be used to lockingly secure and release sections of an apparatus relative to one another. For example, in some embodiments, the lock mechanism disclosed herein can lockingly secure the sections of the apparatus in any configuration or position that the sections can achieve relative to one another in a plurality of different positions. Thus, a user can achieve a desired configuration of the apparatus rather than choosing from a limited number of positions for the apparatus. In some embodiments, the lock mechanism disclosed herein can also be released or unlocked to allow the sections of the apparatus to rotate relative to one another and to different ones of the plurality of different positions.

The lock mechanism disclosed herein can be used in connection with the loading ramp and trailer as disclosed in U.S. Pat. No. 8,123,455 However, it is to be understood that the lock mechanism is not so limited. Instead, the lock mechanism disclosed herein can be used in connection with any apparatus as would be known by those of skill in the art that requires locking sections of the apparatus in a plurality of different positions and releasing the sections to move them relative to one another and to different ones of the plurality of different positions. For example, the lock mechanism can be used with a vehicle that includes folding sections or with an apparatus that functions as a ramp and a trailer for storing and transporting vehicles, such as motorcycles, all-terrain vehicles, snowmobiles, or jet skis. Indeed, the lock mechanism can lockingly secure and release the sections of the apparatus to accommodate vehicles of different sizes and dimensions and position the apparatus relative to vehicles of different sizes and dimensions and in different environments.

As seen in the figures, and most notably in FIG. 1, the lock mechanism 100 disclosed herein can be used in connection with an apparatus 200 that includes at least a first section 210 and a second section 220. The lock mechanism 100 can lock the sections 210, 220 in place relative to one another in a plurality of different positions. The lock mechanism 100 can also release or unlock the sections 210, 220 for moving the sections 210, 220 relative to one another and to different ones of the plurality of different positions.

As seen, the lock mechanism 100 can include at least a first sub-assembly 110, a second sub-assembly 120, a third sub-assembly 130, a fourth sub-assembly 140, and a wedge assembly 150. The first sub-assembly 110 can be securely connected to the first section 210 of the apparatus 200 with which the lock mechanism 100 is used. The first sub-assembly can also be rotatably connected to the wedge assembly 150 via a connection mechanism 160 that can form an axis of rotation for the wedge assembly 150. For example, the wedge assembly 150 can include a wedge handle 152 that can be associated with and dissociated from the first sub-assembly 110 as needed.

The second sub-assembly 120 can be rotatably connected to the first sub-assembly 110 via a connection mechanism 162 that can form an axis of rotation for the second sub-assembly 120. The second sub-assembly can also be connected to the third sub-assembly 130 via an adjustable connection mechanism 164. For example, the connection mechanism 164 can be adjusted to adjust the tension between the second sub-assembly 120 and the third sub-assembly 130 as needed.

The third sub-assembly 130 can be rotatably connected to the fourth sub-assembly 140 via a connection mechanism 168 that can form an axis of rotation for the third sub-assembly 130. Finally, the fourth sub-assembly 140 can be rotatably connected to the second section 220 of the apparatus 200 via a connection mechanism 166 that can form an axis of rotation for the fourth sub-assembly 140. In some embodiments, the fourth sub-assembly 140 can include a spring loaded pin lock 142 that can be engaged to lock the mechanism 100 and secure the third sub-assembly 130 to the fourth sub-assembly 140 and/or secure the fourth sub-assembly 140 to the second section 220 of the apparatus 200 and that can be disengaged to unlock the mechanism 100 and to release the third sub-assembly 130 from the fourth sub-assembly 140 and/or to release the fourth sub-assembly 140 from the second section 220 of the apparatus 200.

Figure 2:
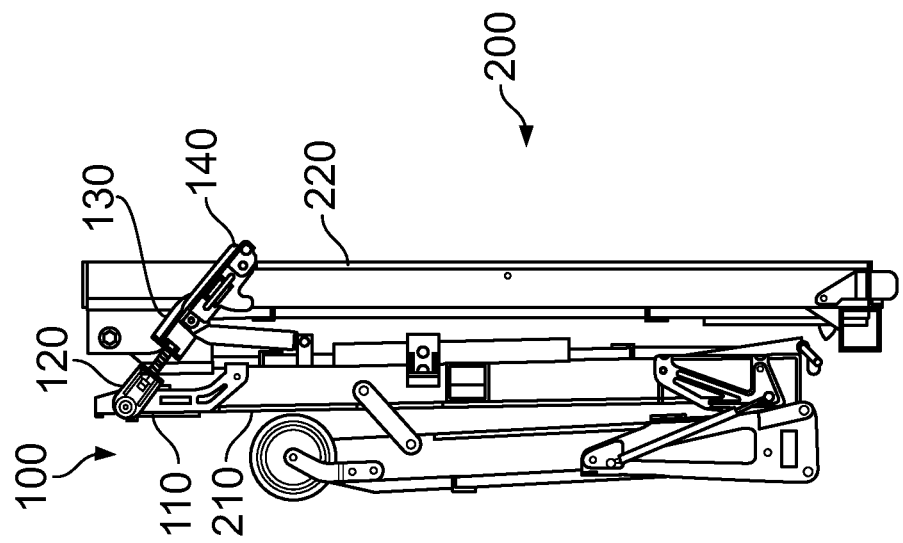
FIG. 2 is a side view of a lock mechanism in accordance with disclosed embodiments securing sections of an apparatus relative to one another in a first position.
Figure 3:
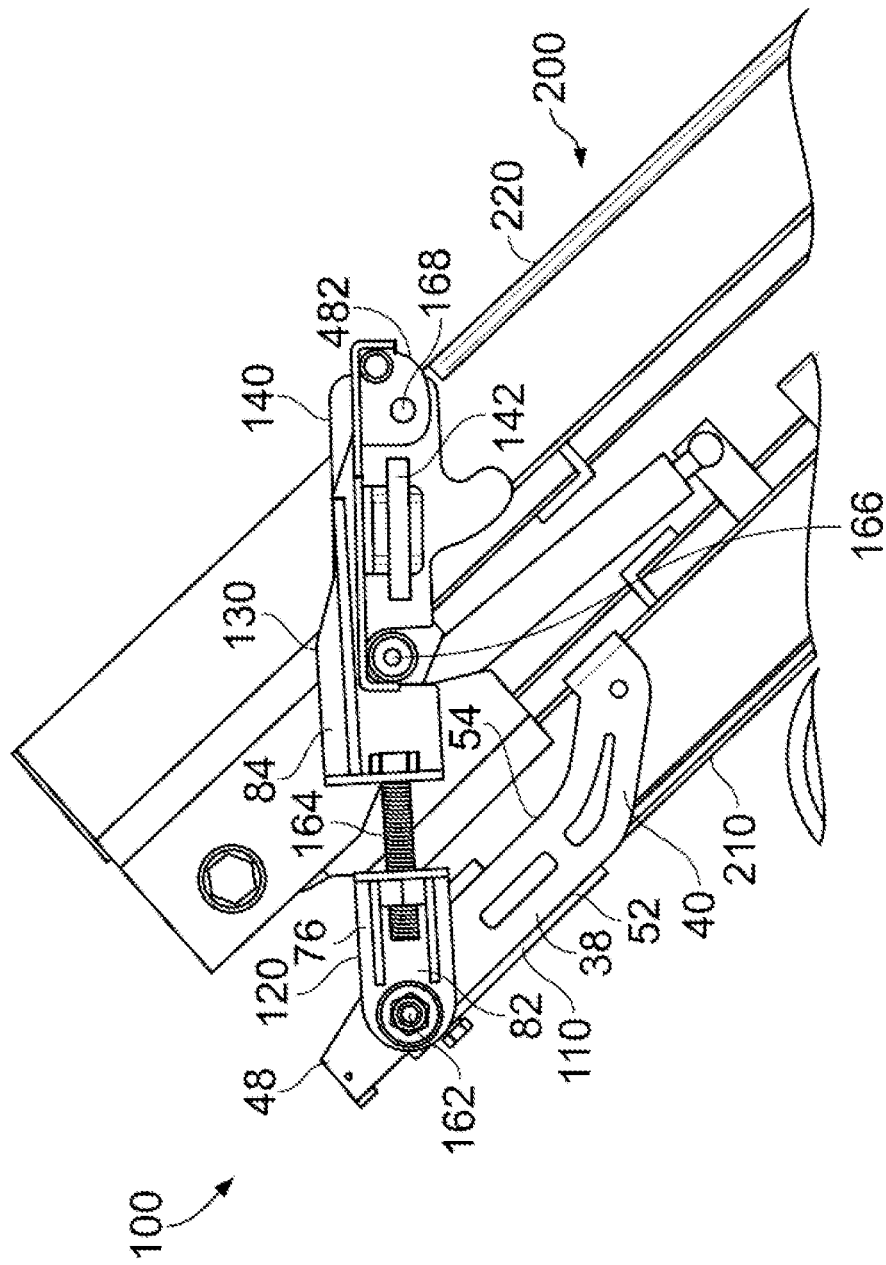
FIG. 3 is a side view of a lock mechanism in accordance with disclosed embodiments securing sections of an apparatus relative to one another in a first position.

As best seen in FIG. 2 and FIG. 3, the lock mechanism 100 can be locked to secure the first and second sections 210, 220 of the apparatus 200 relative to one another in a first position, for example, a folded position, and prevent the first and second sections 210, 220 from rotating relative to one another. To secure the first and second sections 210, 220 relative to one another, the pin lock 142 can be engaged so that the third sub-assembly 130 is secured relative to the fourth sub-assembly 140 and/or so that the fourth sub-assembly is secured relative to the second section 220 of the apparatus 200.

To unlock the mechanism 100, a user can disengage the pin lock 142 by pulling on the pin lock 142. In some embodiments, the pin lock 142 can be spring loaded.

Figure 4:
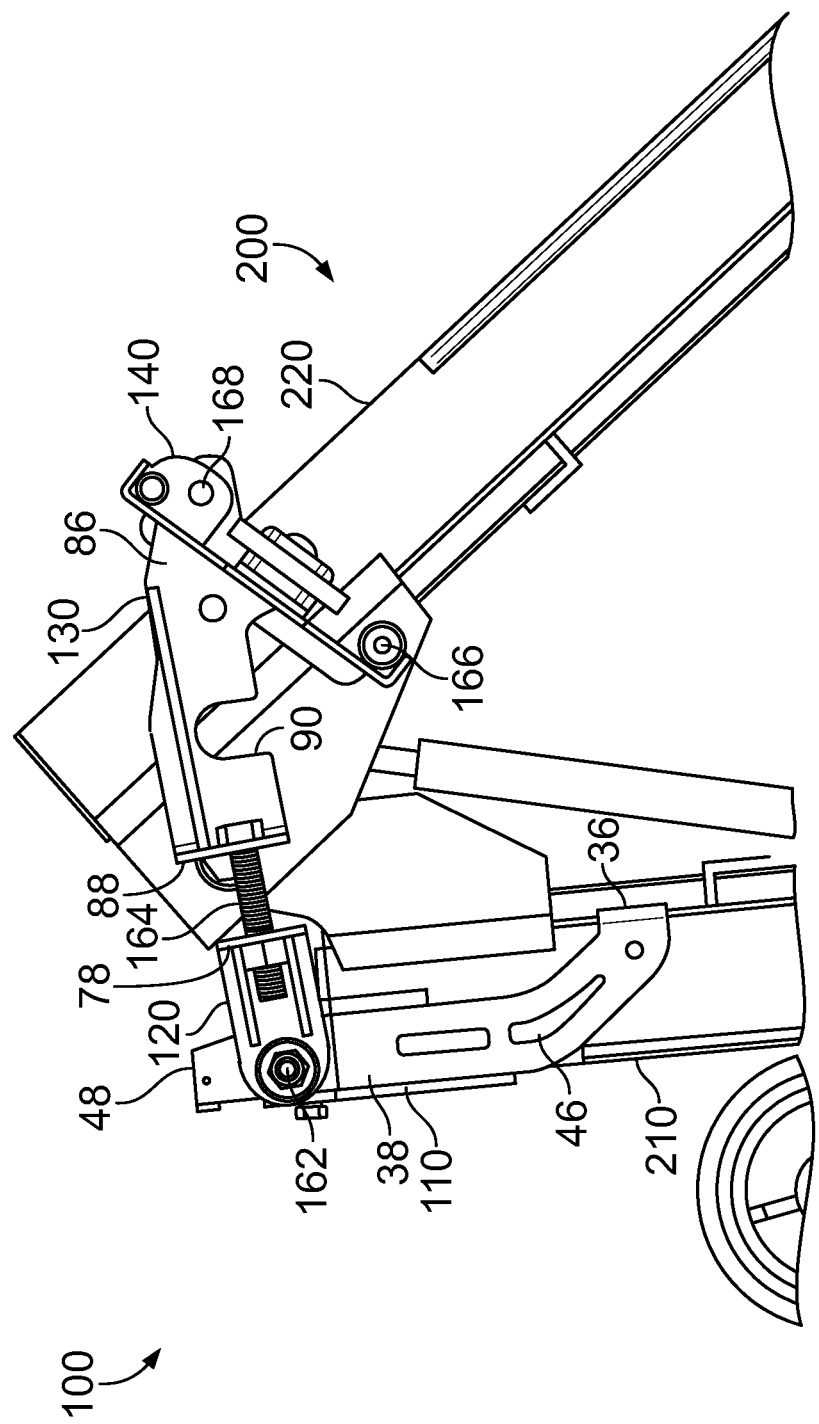
FIG. 4 is a side view of a lock mechanism in accordance with disclosed embodiments allowing rotation of sections of an apparatus relative to one another.
Figure 5:
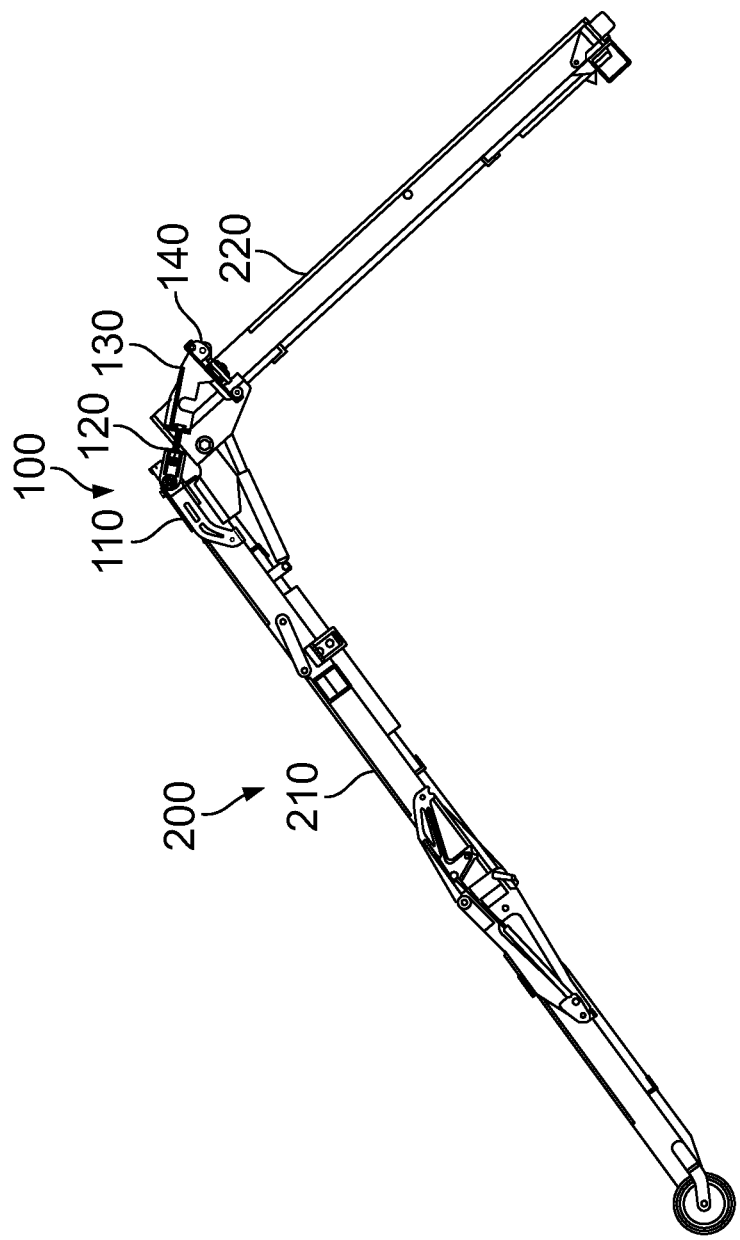
FIG. 5 is a side view of a lock mechanism in accordance with disclosed embodiments allowing rotation of sections of an apparatus relative to one another.

When the pin lock 142 is disengaged, the third sub-assembly 130 can rotate relative to the fourth sub-assembly 140 about the axis of rotation defined by the connection mechanism 168. Further, the second sub-assembly 120 can rotate relative to the first sub-assembly 110 about the axis of rotation defined by the connection mechanism 162. As best seen in FIG. 4 and FIG. 5, as the third sub-assembly 130 rotates relative to the fourth sub-assembly 140 and as the second sub-assembly 120 rotates relative to the first sub-assembly 110, the second section 220 of the apparatus 210 can rotate relative to the first section 210 of the apparatus 200.

Figure 6:
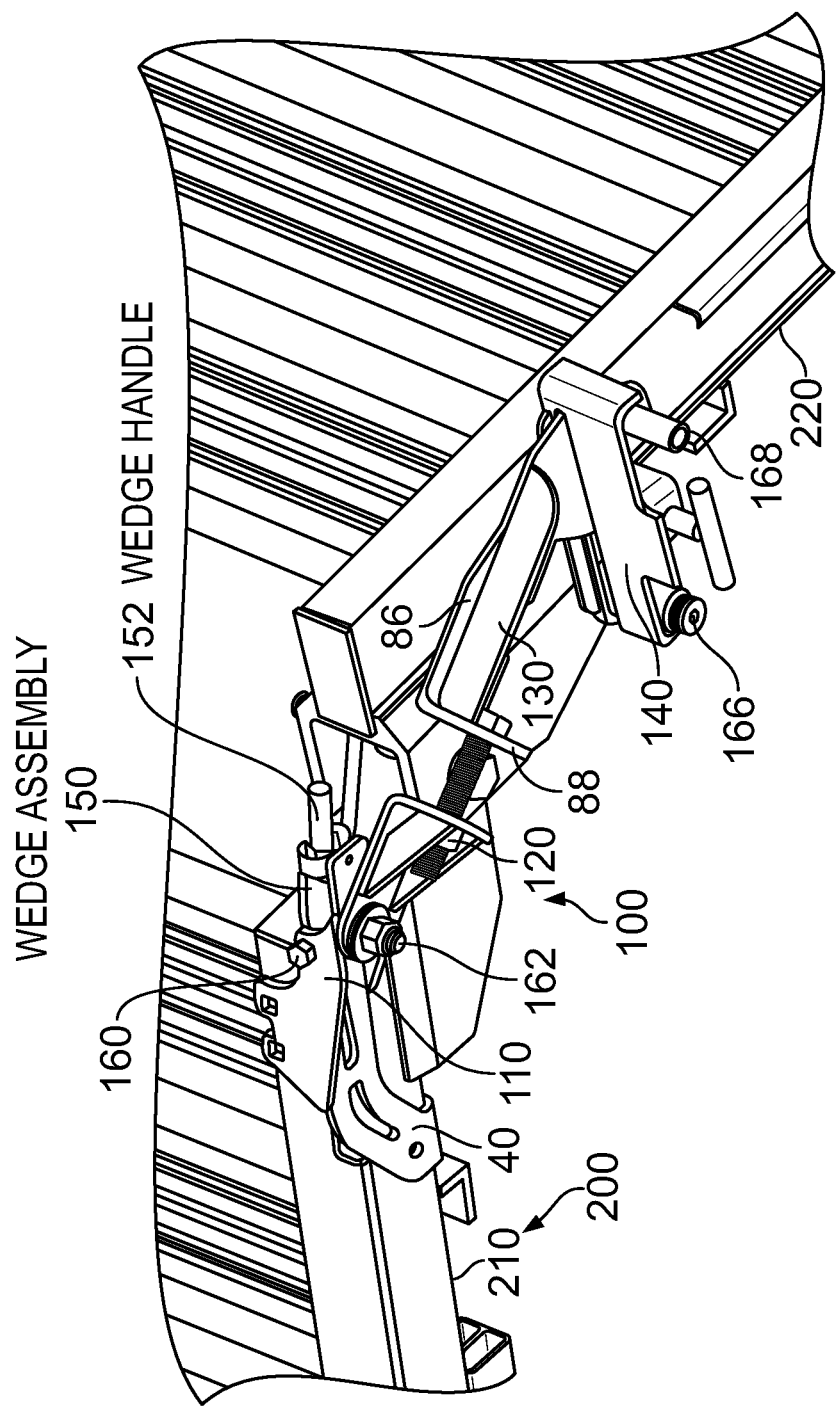
FIG. 6 is a top perspective view of a lock mechanism in accordance with disclosed embodiments with a wedge assembly in a first position.
Figure 7:
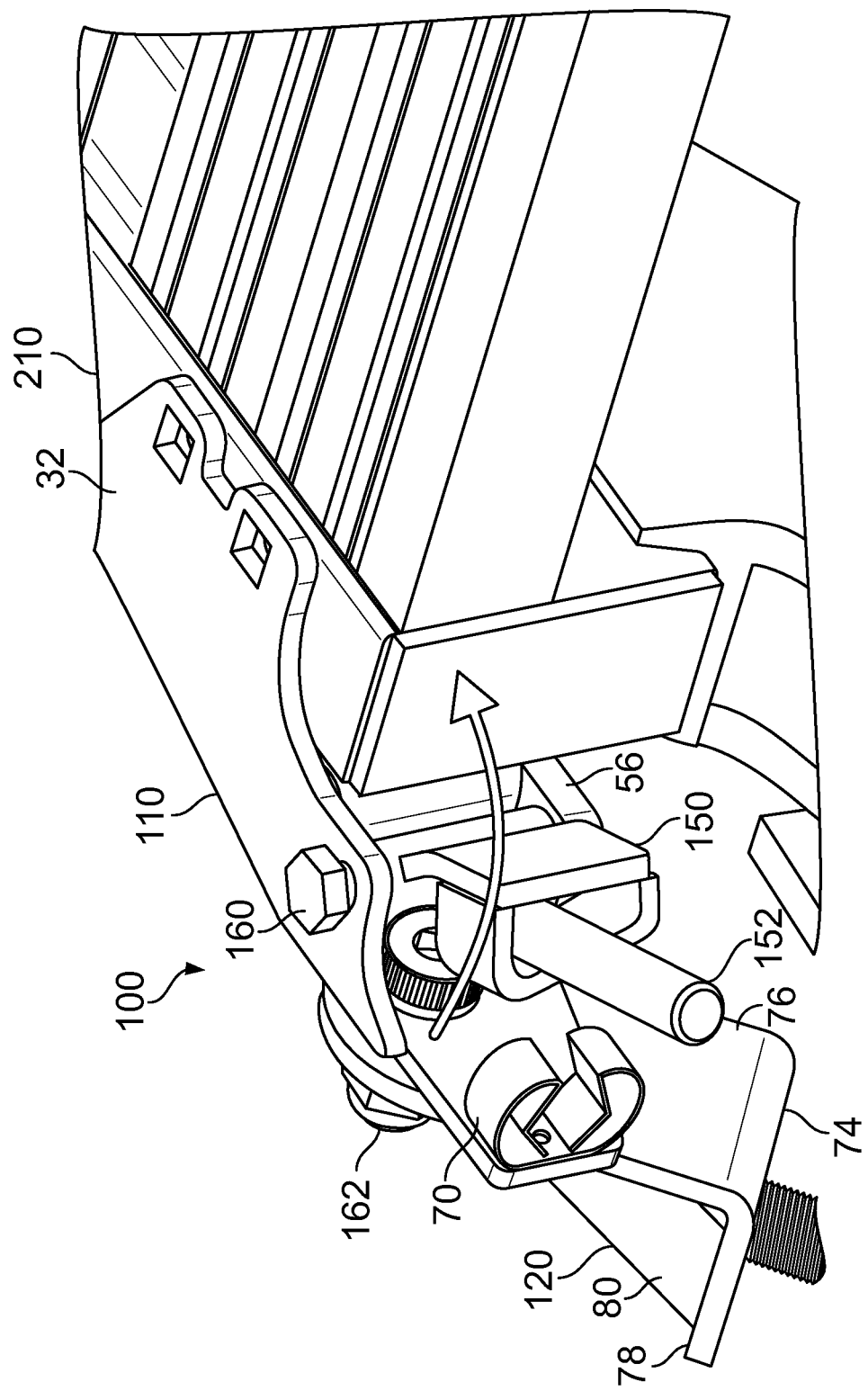
FIG. 7 is a side perspective view of a lock mechanism in accordance with disclosed embodiments with a wedge assembly in between first and second positions.
Figure 8:
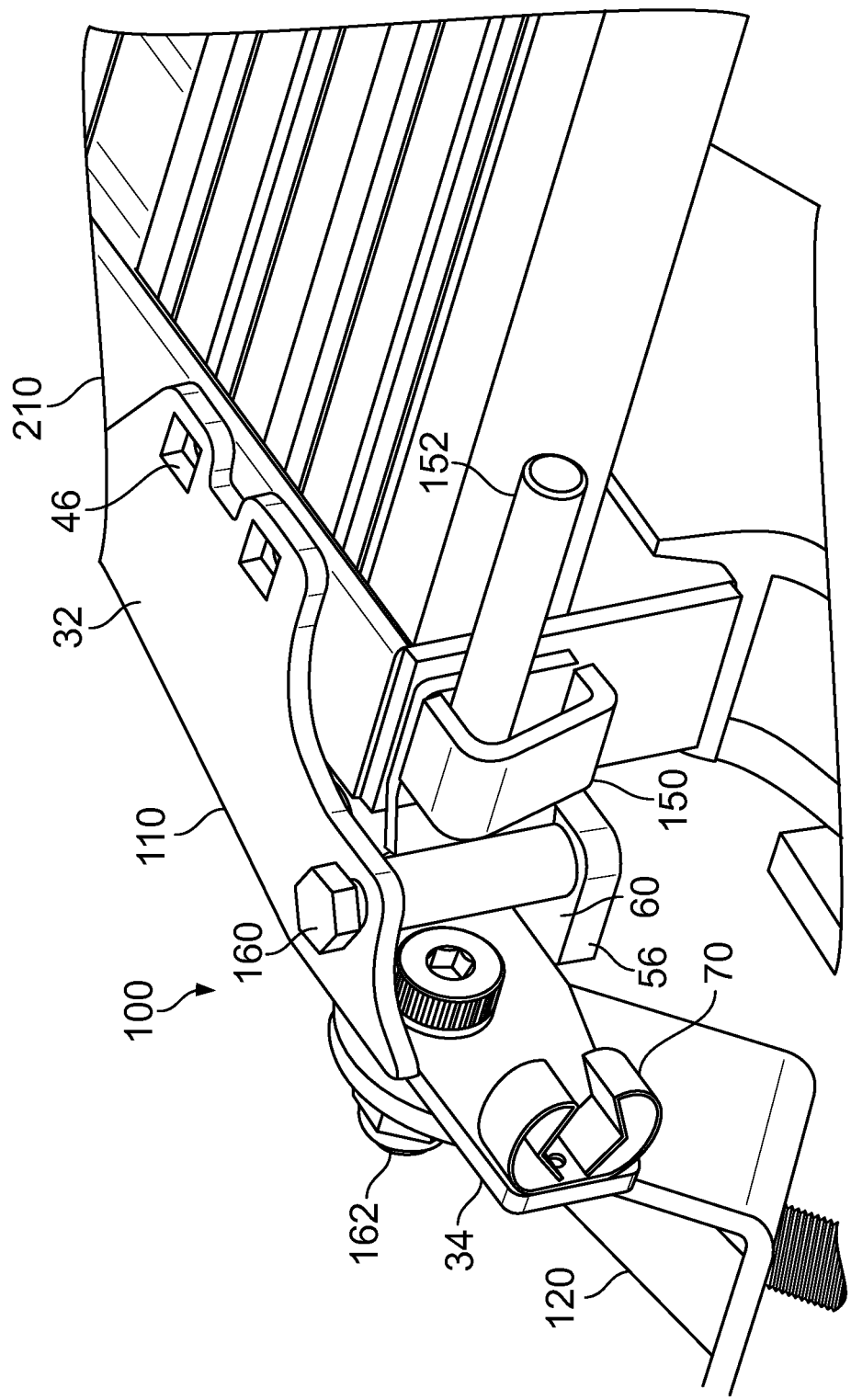
FIG. 8 is a side perspective view of a lock mechanism in accordance with disclosed embodiments with a wedge assembly in a second position.
Figure 9:
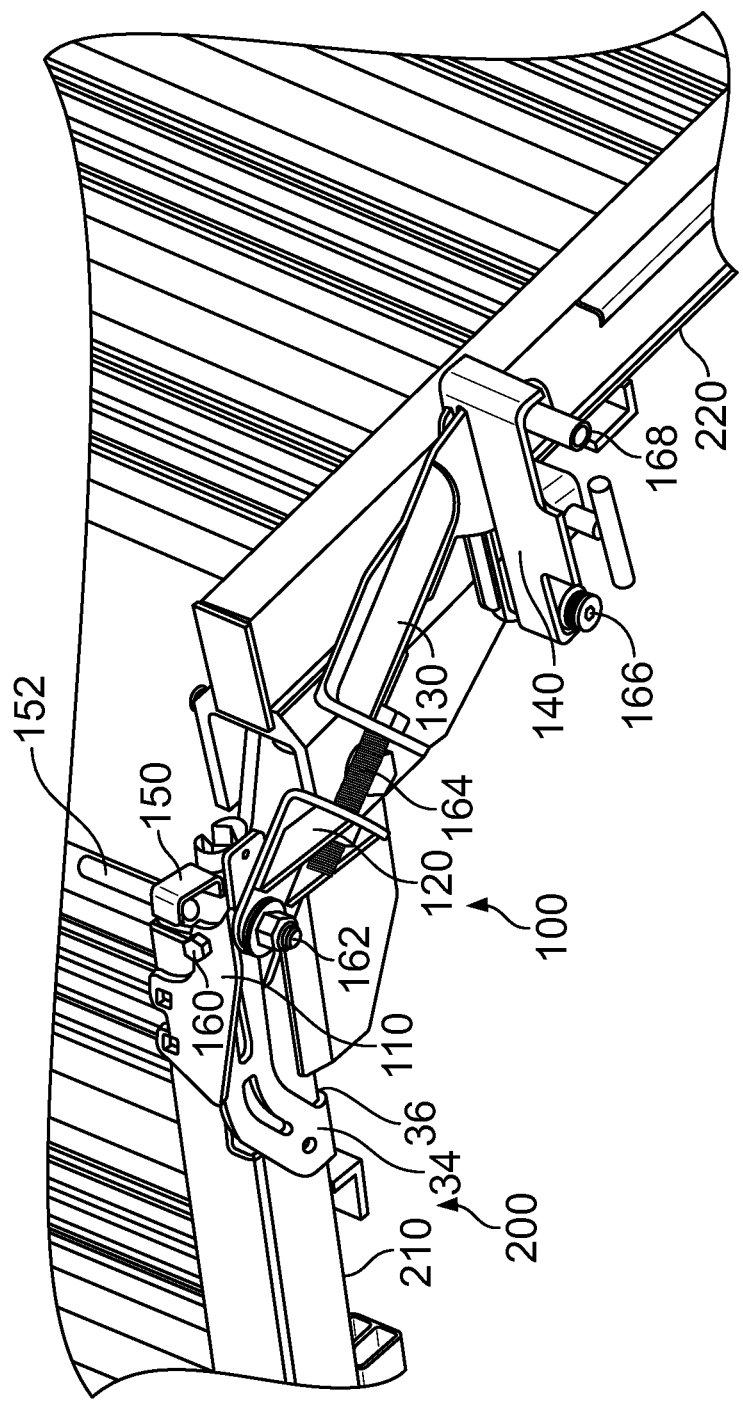
FIG. 9 is a top perspective view of a lock mechanism in accordance with disclosed embodiments with a wedge assembly in a second position.

When the lock mechanism 100 is unlocked, as the third sub-assembly 130 rotates relative to the fourth sub-assembly 140, as the second sub-assembly 120 rotates relative to the first sub-assembly 110, and as the second section 220 rotates relative the first section 210, other sections of the lock mechanism 100 can be moved for securing the first and second sections 210, 220 of the apparatus 200 relative to one another in a second position, for example, in a partially unfolded position that would be suitable for the sections 210, 220 of the apparatus 200 acting as a ramp. For example, as best seen in FIG. 6, the wedge assembly 150 can be in a first position that includes the wedge handle 152 being associated with at least a portion of the first sub-assembly 110. In the first position, all portions of the wedge assembly 150 can be adjacent to a side of the first section 210 of the apparatus 200 so that no portion of the wedge assembly 150 is disposed between the first and second sections 210, 220 of the apparatus 200. As best seen in FIG. 7, a user can engage the wedge assembly 150, for example, by pulling on the wedge handle 152, to dissociate the wedge handle 152 from the first sub-assembly 110 and cause the wedge assembly 150 to rotate about an axis of rotation defined by the connection mechanism 160 in a direction indicated by the arrow. The wedge assembly 150 can rotate to a second position that is best seen in FIG. 8 and FIG. 9 and includes at least a portion of the wedge assembly 150 being adjacent to an end of the first section 210 of the apparatus 200 so that the portion of the wedge assembly 150 is disposed between the first and second sections 210, 220 of the apparatus 200.

In some embodiments, the wedge assembly 150 can be spring loaded so that a spring is compressed when the wedge assembly 150 is in the first position and decompressed when the wedge assembly is in the second position. Accordingly, the first sub-assembly 110 can secure the wedge assembly 150 in the first position and when released therefrom, the wedge assembly 150 can be biased for moving to the second position. The wedge assembly 150 can remain in the second position until user intervention causes the assembly 150 to move back to the first position and be secured by the first sub-assembly 110.

Figure 10:
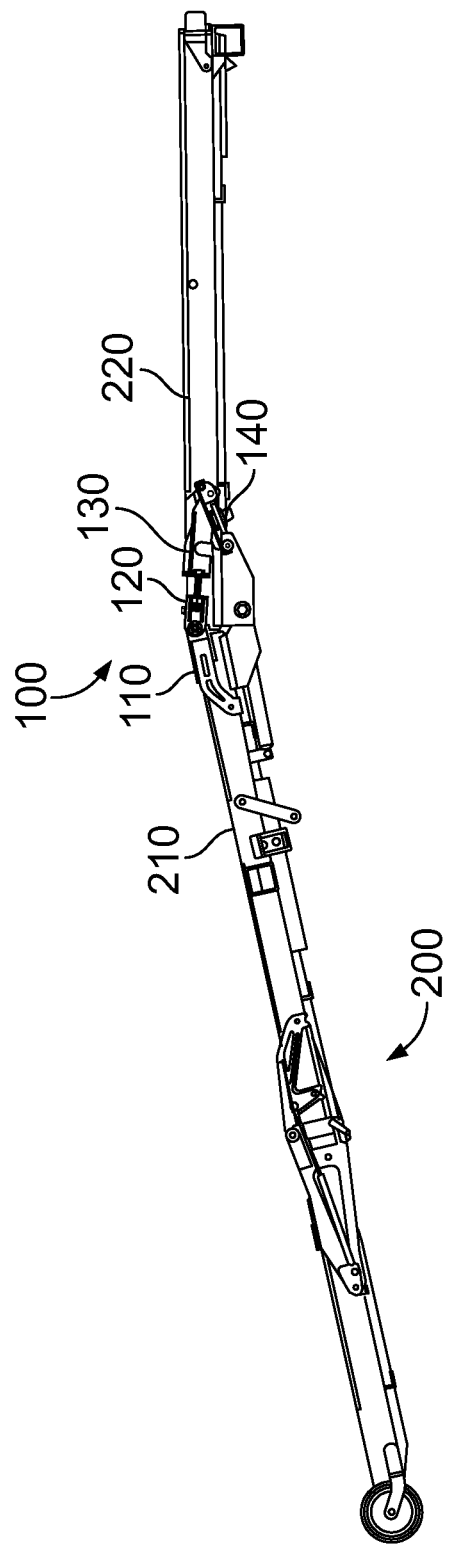
FIG. 10 is a side view of a lock mechanism in accordance with disclosed embodiments securing sections of an apparatus relative to one another in a second position.
Figure 11:
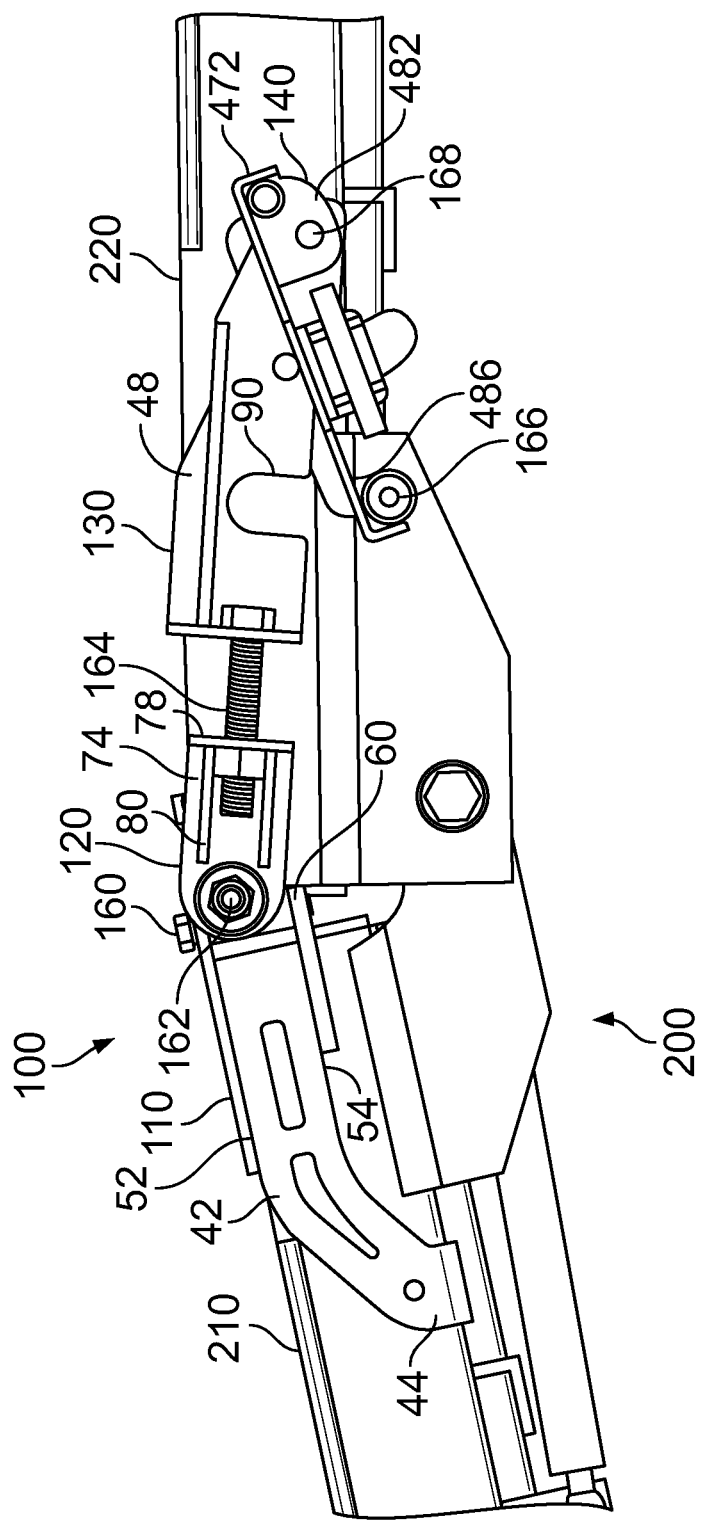
FIG. 11 is a side view of a lock mechanism in accordance with disclosed embodiments securing sections of an apparatus relative to one another in a second position.

When the lock mechanism 100 is unlocked and the wedge assembly 150 is in the second position, the third sub-assembly 130 can continue rotating relative to the fourth sub-assembly 140, the second sub-assembly 120 can continue rotating relative to the first sub-assembly 110, and the second section 220 can continue rotating relative the first section 210 until the first and second sections 210, 220 of the apparatus 200 are in the second position, for example, in a partially unfolded position that would be suitable for the sections 210, 220 of the apparatus 200 acting as a ramp. As best seen in FIG. 10 and FIG. 11, the lock mechanism 100 can secure the first and second sections 210, 220 of the apparatus 200 relative to one another in the second position. As further seen in FIG. 12, when the lock mechanism 100 secures the first and second sections 210, 220 of the apparatus 200 relative to one another in the second position, the wedge assembly 150 can be disposed between ends of the first and second sections 210, 220 so that the ends of the first and second sections 210, 220 are not flush with each other and so that the second section 220 is at an angle between 0° and 180° relative to the first section 210. That is, when the lock mechanism 100 secures the first and second sections 210, 220 of the apparatus 200 relative to one another in the second position, the wedge assembly 200 can function as a bridge between the first and second sections 210, 220 of the apparatus 200.

Figure 13:
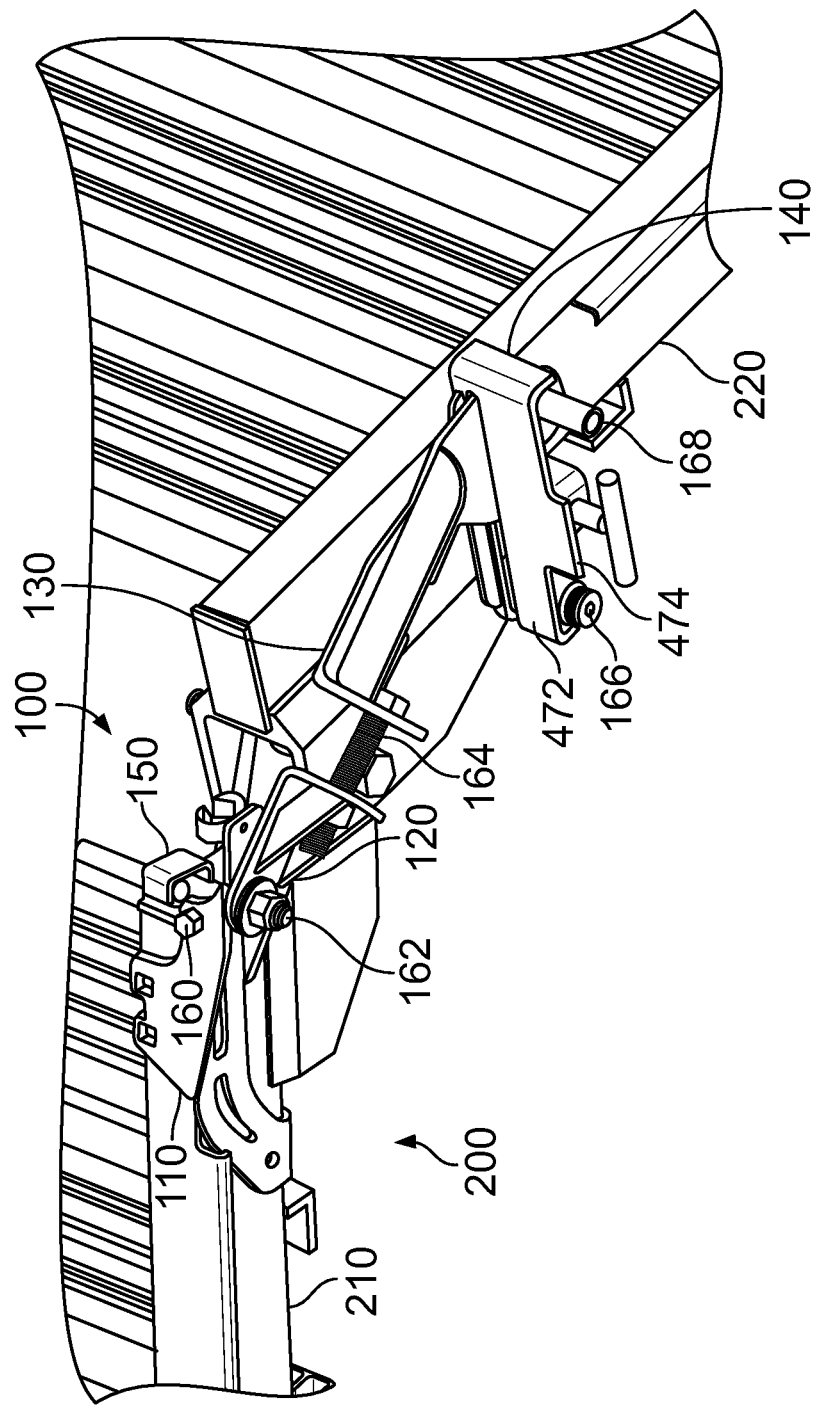
FIG. 13 is a top perspective view of a lock mechanism in accordance with disclosed embodiments with a wedge assembly in a second position.
Figure 14:
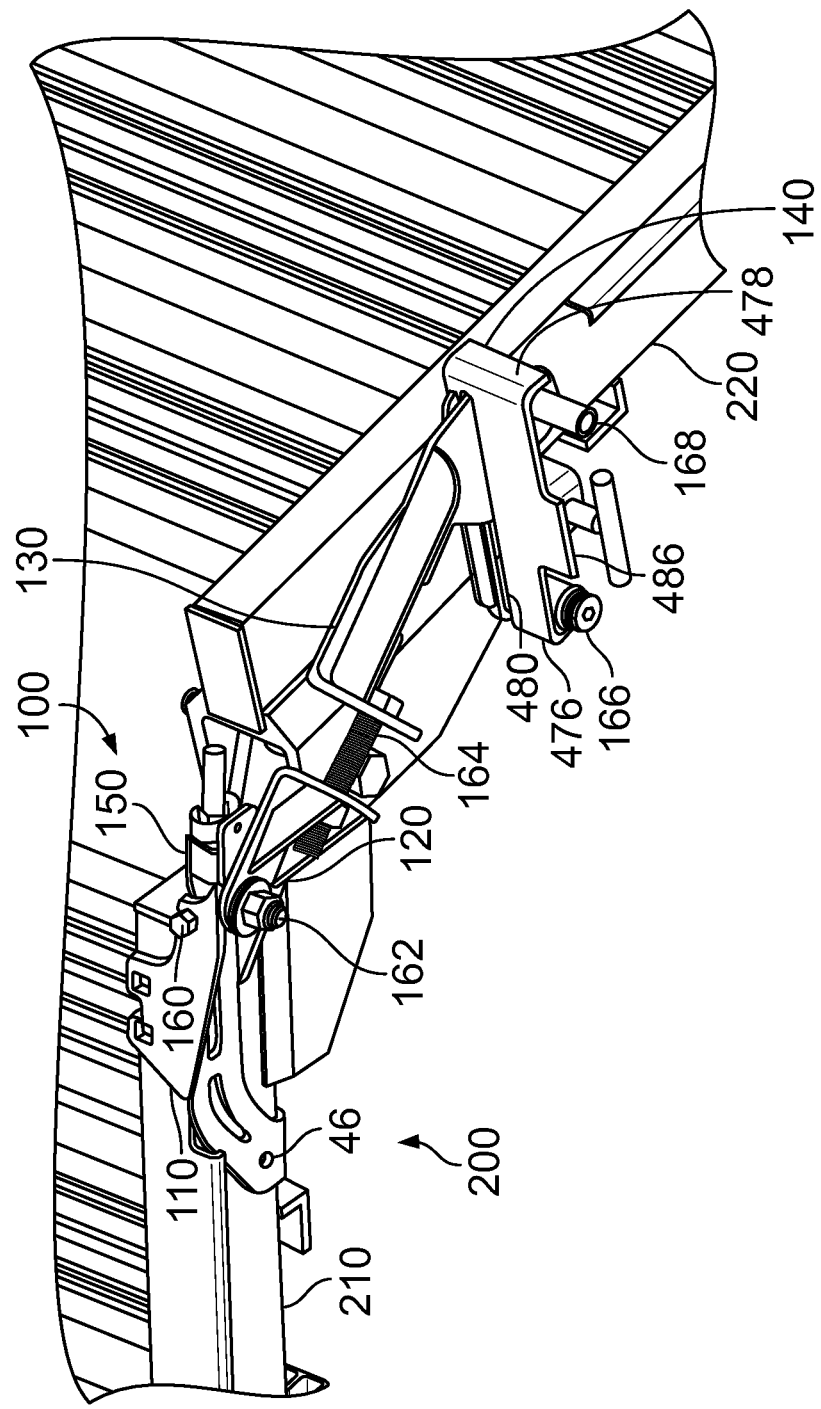
FIG. 14 is a top perspective view of a lock mechanism in accordance with disclosed embodiments with a wedge assembly in a first position.

The lock mechanism 100 can be unlocked to release the first and second sections 210, 220 of the apparatus 200 from the second position, and when released, the third sub-assembly 130 can continue rotating relative to the fourth sub-assembly 140, the second sub-assembly 120 can continue rotating relative to the first sub-assembly 110, and the second section 220 of the apparatus 200 can continue rotating relative to the first section 210 of the apparatus 200. When the lock mechanism 100 is unlocked, as the third sub-assembly 130 rotates relative to the fourth sub-assembly 140, as the second sub-assembly 120 rotates relative to the first sub-assembly, and as the second section 220 rotates relative to the first section 210, other sections of the lock mechanism can be moved for securing the first and second sections 210, 220 of the apparatus 200 relative to one another in a third position, for example, in a completely unfolded position that would be suitable for the sections 210, 220 of the apparatus 200 acting as a trailer. For example, as best seen in FIG. 13 and FIG. 14, the wedge assembly 150 can be moved from the second position shown in FIG. 13 to the first position shown in FIG. 14. That is, the wedge assembly 150 can be moved from a position in which at least a portion of the wedge assembly 150 is adjacent to an edge of the first section 210 of the apparatus 200 so that the portion of the wedge assembly 150 is disposed between the first and second sections 210, 220 of the apparatus 200 to a position in which all portions of the wedge assembly 150 are adjacent to a side of the first section 210 of the apparatus 200 so that no portion of the wedge assembly 150 is disposed between the first and second sections of the apparatus 200. In some embodiments, a user can engage the wedge assembly 150, for example, by pulling on the wedge handle 152, to move the wedge assembly 150 from the second position to the first position and associate and secure the wedge handle 152 with the first sub-assembly 110. As the wedge assembly 150 moves from the second position to the first position, the wedge assembly 150 can rotate about the axis of rotation defined by the connection mechanism 160.

Figure 15:
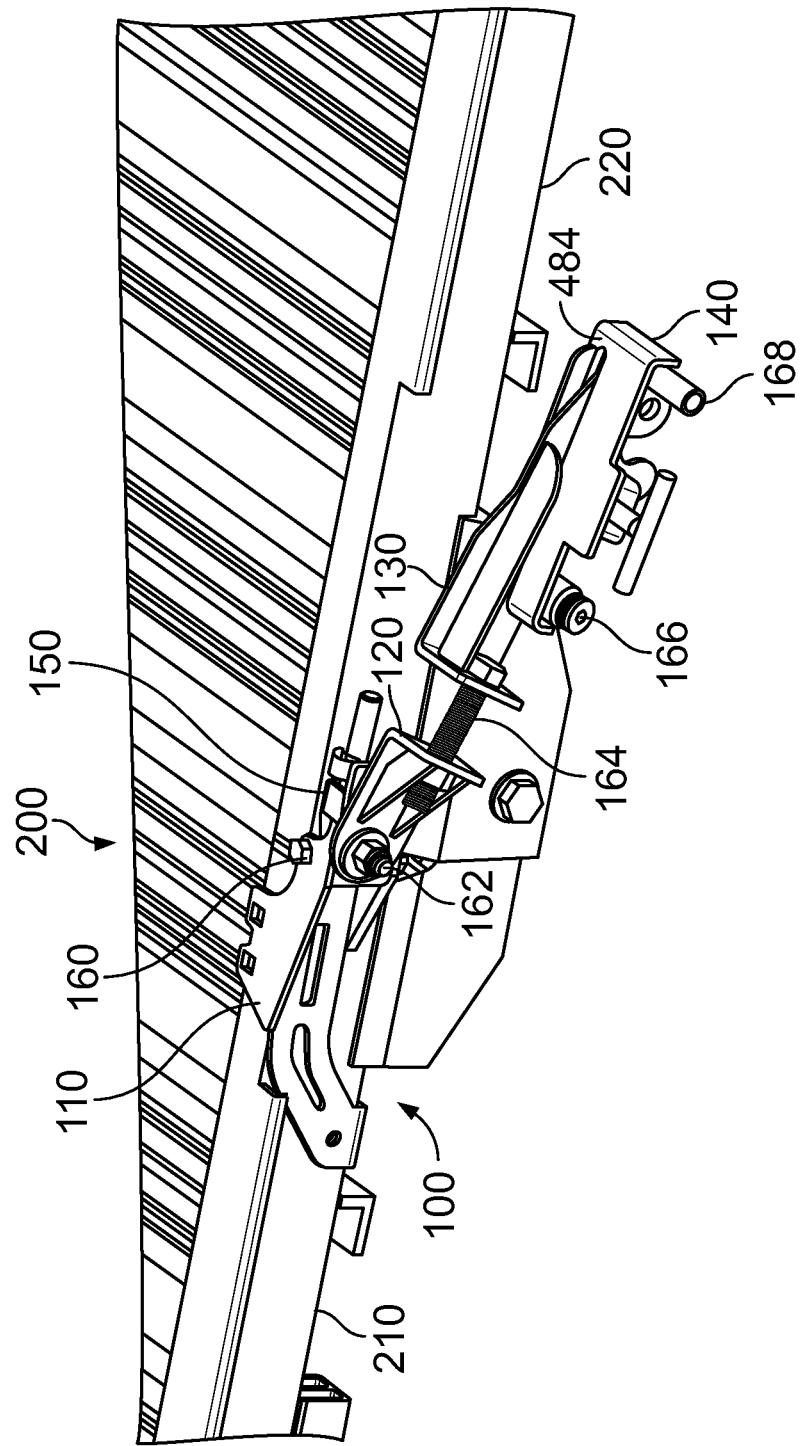
FIG. 15 is a top perspective view of a lock mechanism in accordance with disclosed embodiments in position for facilitating sections of an apparatus being in a third position.
Figure 16:
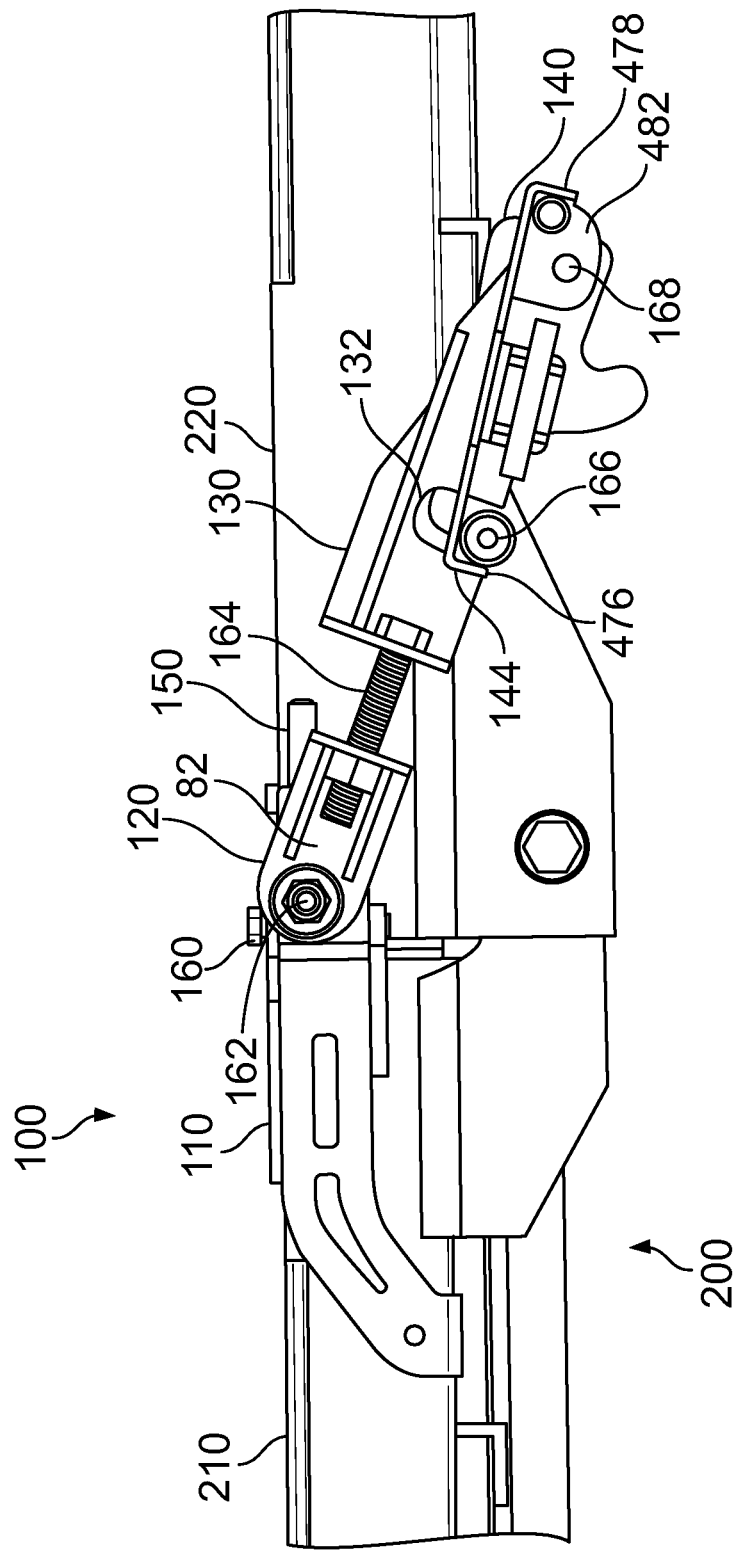
FIG. 16 is a side view of a lock mechanism in accordance with disclosed embodiments in position for facilitating sections of an apparatus being in a third position.

When the lock mechanism 100 is unlocked and the wedge assembly 150 is in the first position, the third sub-assembly 130 can continue rotating relative to the fourth sub-assembly 140, the second sub-assembly 120 can continue rotating relative to the first sub-assembly, and the second section 220 can continue rotating relative to the first section 210 until the first and second sections 210, 220 of the apparatus 200 are in the third position, for example, in a completely unfolded position that would be suitable for the sections 210, 220 of the apparatus 200 acting as a trailer. As best seen in FIG. 15 and FIG. 16, the lock mechanism 100 can be in a position that facilitates the first and second sections 210, 220 of the apparatus 200 being in the third position.

Figure 16A:
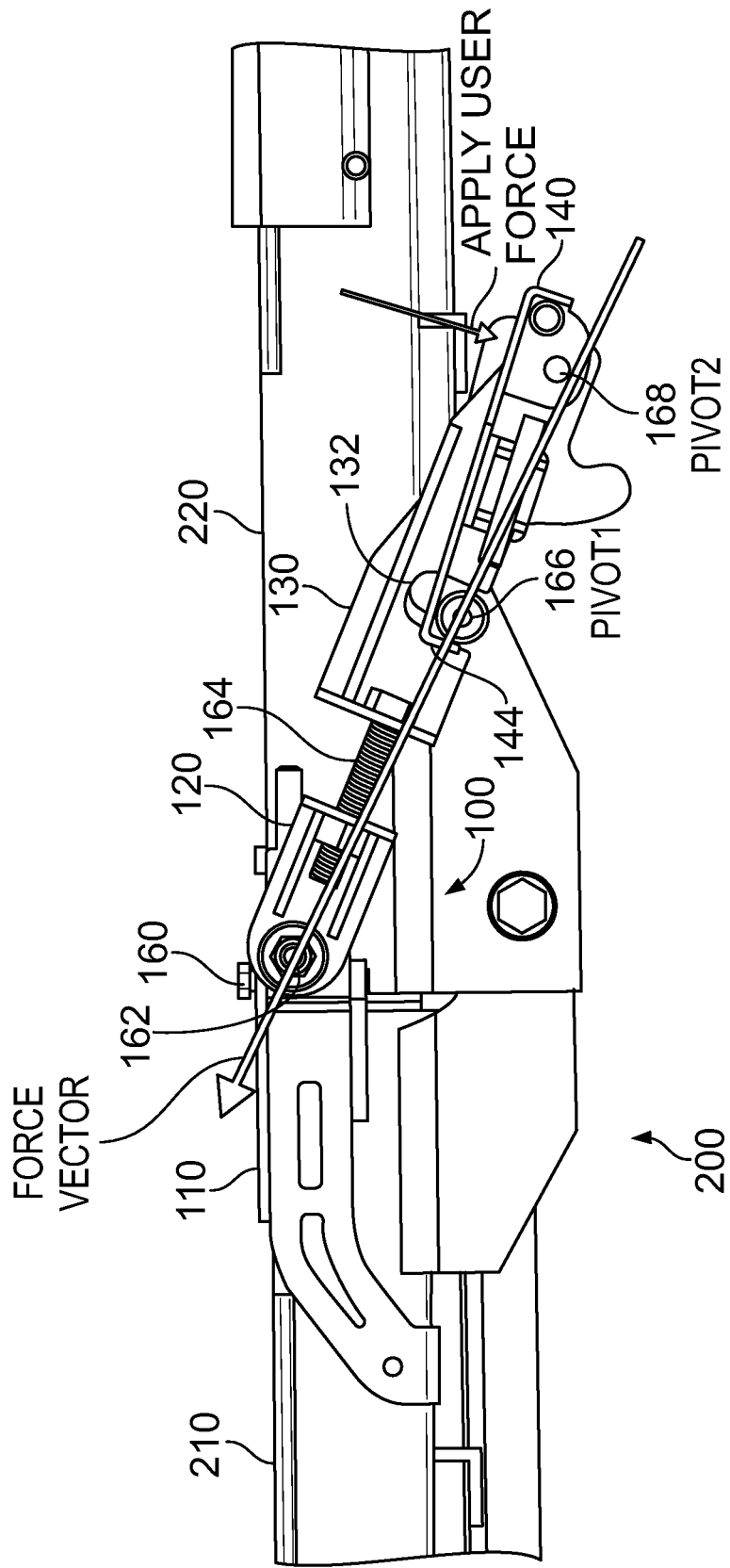
FIG. 16A is a side view of a lock mechanism in accordance with disclosed embodiments in position for facilitating sections of an apparatus being in a third position and illustrating a force vector acting on the lock mechanism.

When the lock mechanism 100 is in position to facilitate the first and second sections 210, 220 of the apparatus 200 being in the third position, a force vector can be created along an axis of the mechanism 100. For example, as seen in FIG. 16A, the force vector can be along an axis that intersects the connection mechanism 160 and the connection mechanism 166. However, before the mechanism 100 is locked, the connection mechanism 168 can be above the force vector.

Figure 17:
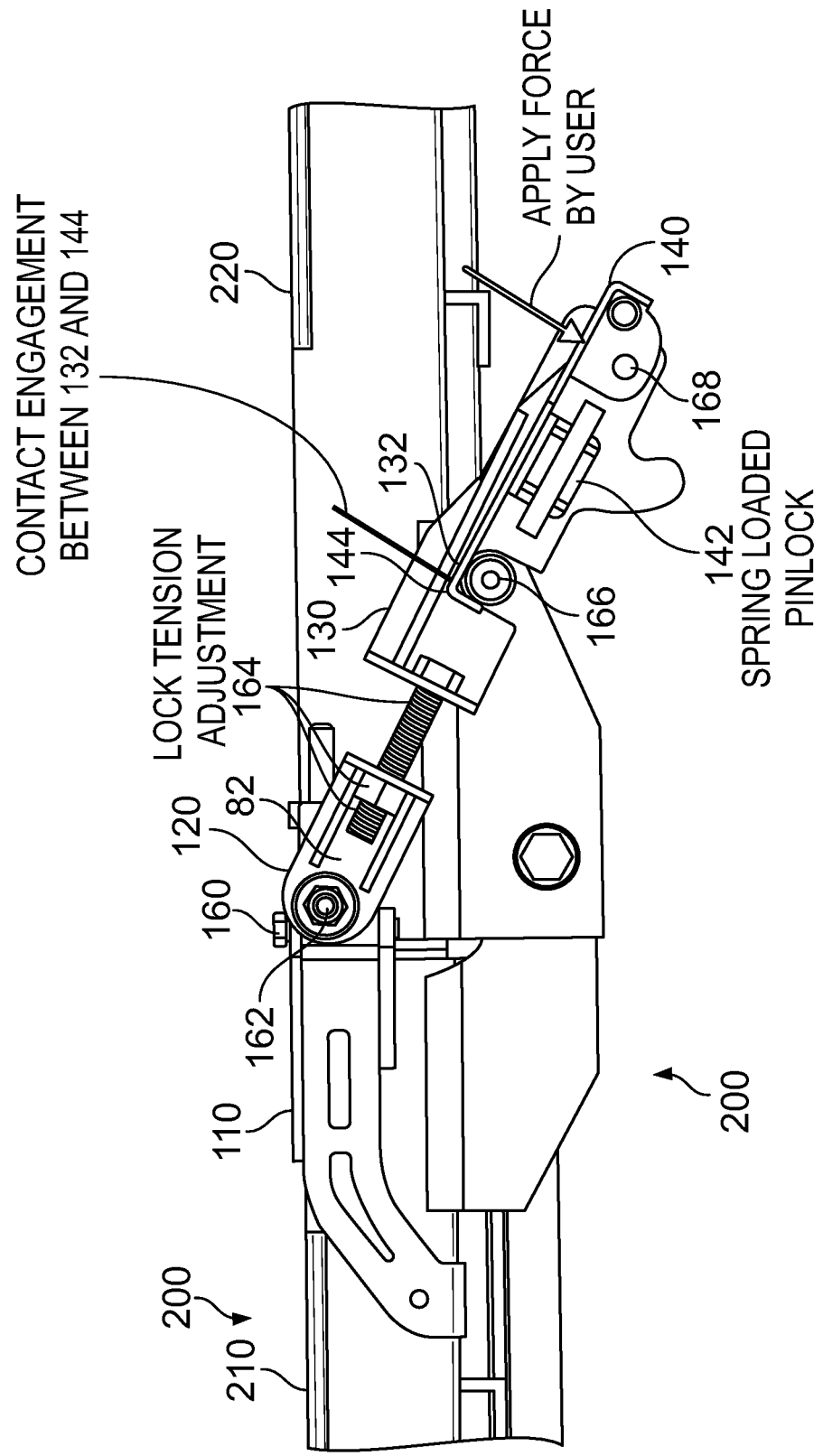
FIG. 17 is a side view of a lock mechanism in accordance with disclosed embodiments securing sections of an apparatus relative to one another in a third position.
Figure 17A:
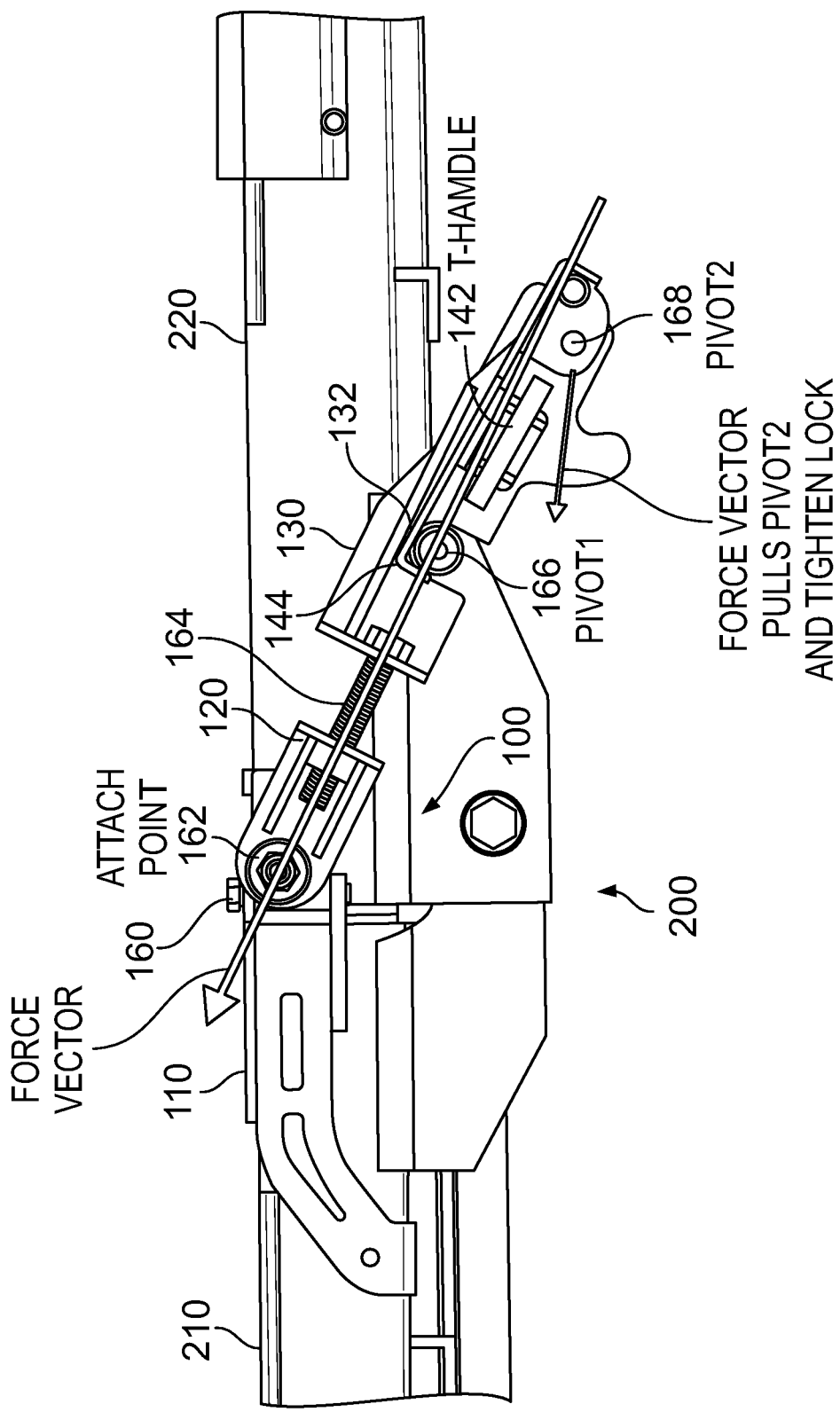
FIG. 17A is a side view of a lock mechanism in accordance with disclosed embodiments securing sections of an apparatus relative to one another in a third position and illustrating force vectors acting on the lock mechanism.
Figure 18:
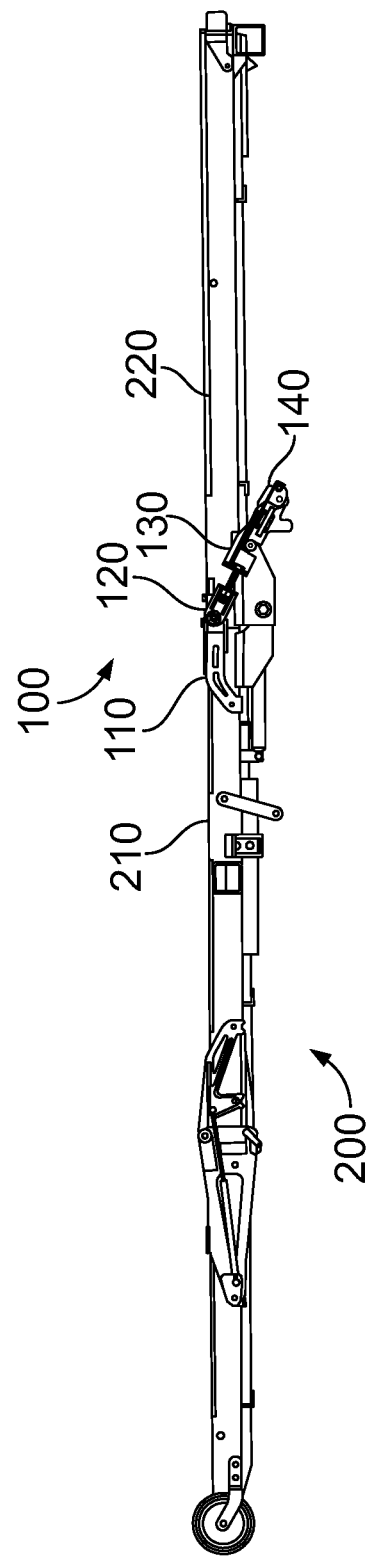
FIG. 18 is a side view of a lock mechanism in accordance with disclosed embodiments securing sections of an apparatus relative to one another in a third position.

A user can apply a force to the fourth sub-assembly 140 in the direction shown by the force arrow in FIG. 16A to lock the mechanism 100 and secure the first and second sections 210, 220 of the apparatus 200 relative to one another in the third position. For example, as seen in FIG. 17 and FIG. 18, when a user applies force to the fourth sub-assembly 140, a contact point 144 of the fourth sub-assembly 140 can engage a contact point 132 of the third sub-assembly 130. Furthermore, as seen in FIG. 17A, when the contact point 144 of the fourth sub-assembly 140 engages the contact point 132 of the third sub-assembly 130 and the mechanism 100 is locked, the connection mechanism 160 and the connection mechanism 166 can intersect the force vector of the mechanism 100 along which the holding force of the mechanism 100 acts. However, when the mechanism 100 is locked, the connection mechanism 168 can be below the force vector. Accordingly, when a force trying to separate the sections 210, 220 is applied, for example, at the connection mechanism 162, a second force vector can be created as seen in FIG. 17A, which pulls the connection mechanism 168 further down and into the locked position, thereby securing and further tightening the mechanism 100 and the associated apparatus 200.

In some embodiments, a user can also engage the pin lock 142 to lock the mechanism 100. Furthermore, in some embodiments, a user can adjust the connection mechanism 164 as needed to adjust the tension between the second sub-assembly 120 and the third sub-assembly 130, thereby adjusting the locking pressure of the mechanism 100. For example, the connection mechanism 164 can include a bolt and screw, and the bolt can be threaded along the length of the screw to adjust a distance between the second sub-assembly 120 and the third sub-assembly.

In some embodiments, the lock mechanism 100 can comprise first, second, third, and fourth lock components 110, 120, 130, 140 connected to each other in a progressive fashion with the lock mechanism 100 securing to the apparatus 200 via the first and fourth lock components 110, 140. As seen in FIG. 1, a first portion of the first lock component 110 can be secured to a first device section 210 of the apparatus 200 while a second portion of the first lock component 110 can be secured to a first end of the second lock component 120 via a first rotatable connection mechanism 162. The first rotatable connection mechanism 162 can secure the first lock component 110 to a first end of the second rotatable connection mechanism 120 so as to allow the components to rotate with respect to each other.

A second, opposite end of the second lock component 120 can be connected to a first end of the third lock component 130 via an adjustable connecting or spanning mechanism 164 that can maintain the second end of the second lock component 120 at a selected distance from the first end of the third lock component 130. A second, opposite end of the third lock component 130 can connect to a first end of the fourth lock component 140, and the third and fourth lock components 130, 140 can be secured via a second rotatable connection mechanism 168. For example, the second rotatable connection mechanism 168 can secure the third and fourth lock components 130, 140 together to allow them to rotate with respect to each other.

A second, opposite end of the fourth lock component 140 can be secured to a second device section 220 of the device 200 via a third rotatable connection mechanism 166, which can act as a second anchoring mechanism. For example, the third rotatable connection mechanism 166 can secure the fourth lock component 140 and the second device section 220 together so as to allow them to rotate with respect to each other.

Each of the first, second, and third rotatable connection mechanisms 162, 168, 166 can be any type of rotating attachment or fastening mechanism as would be known by those of ordinary skill in the art, for example, a pin, a bolt, or a screw. Furthermore, the spanning connection mechanism 164 can be any type of attachment or fastening mechanism suitable for securing components at a distance from each other and as would be known by those of ordinary skill in the art, for example, a bolt or a screw.

The lock mechanism 100 can be secured to the device 200 via a first anchor mechanism 160 attaching a first end of the lock mechanism 100 to the first device section 210 and via a second anchor mechanism 166 attaching a second end of the lock mechanism 100 to the second device section 220.

The first anchor mechanism 160 can secure the first lock component 110 to the first device section 210, and the second anchor mechanism 16 can secure the fourth lock component 140 to the second device section 220, with the second and third lock components 120, 130 therebetween for indirectly connecting the first and fourth lock components 110, 140 to each other.

After the lock mechanism 100 is secured to the first and second device sections 210, 220, the position of one (or more) of the first, second, third, and fourth lock components 110, 120, 30, 140 can be adjusted with respect to another while leaving intact secure connections between (i) the lock mechanism 100 and the first device section 210 and (ii) the lock mechanism 100 and the second device section 220. That is, a user can change the configuration of the lock mechanism 100 to a plurality of different positions without unsecuring the lock mechanism 100 from the device 200. Accordingly, the device 200 can be moved from a first position to a second position by loosening or unfastening any connection mechanism, moving one or more of the lock components secured by that connection mechanism, and re-securing or refastening that connection mechanism. In this manner, the user is not limited to simply one or two predetermined configuration options, but instead, can secure the lock components into any of the plurality of different positions they can achieve with respect to each other.

In some embodiments, the user can lockingly secure the lock mechanism 100 into any of the plurality of different positions that the first, second, third, and fourth lock components 110, 120, 130, 140 can achieve while connected to each other.

The user has many choices for adjusting positions of neighboring ones of the lock components with respect to each other, thereby enabling the user to choose from an almost infinite number of configurations for the lock mechanism 100.

One way to adjust the positions of the neighboring ones of the lock components can involve loosening or unfastening the rotatable connection mechanism joining or connecting the neighboring ones of the lock components to allow the user to rotate the neighboring ones of the lock components from defining a first angle to adopting a second angle. For example, while the lock mechanism 100 is secured to the device 200, the user can loosen the first rotatable connection mechanism 162 securing the first and second lock components 110, 120 to each other in a first configuration, rotate the first and second lock components 110, 120 from a first angle to a second, different angle defining a second configuration, and manipulate the first rotatable connection mechanism 162 to secure the first and second lock components 110, 120 into the second configuration. As desired, the user can manipulate the first rotatable connection mechanism 162 to allow for rotation of the first and second lock components 110, 120 to any angle achievable by thereby, and then manipulate the first rotatable connection mechanism 162 to secure the first and second lock components 110, 120 into a rigid, unmoving position.

As another example, while the lock mechanism 100 is secured to the device 200, the user can loosen the second rotatable connection mechanism 168 that joins and secures the third and fourth lock components 130, 140 to each other in a first configuration, rotate the third and fourth lock components 130, 140 from a first angle to a second different angle defining a second configuration, and manipulate the second rotatable connection mechanism 168 to secure the third and fourth lock components 130, 140 into the second configuration. In some embodiments, an engagement between a groove 90 in the third lock component 130 and the third rotatable connection mechanism 166 can limit the amount of movement achievable by the third and fourth lock components 130, 140 with respect to each other, for example, as seen in FIG. 3.

As another example, while the lock mechanism 100 is secured to the device, the user can loosen the third rotatable connection mechanism 166 that secures the fourth lock component 140 to the second device section 220 a first configuration, rotate the fourth lock component 140 and the second device section 220 front a first angle to a second, different angle defining a second configuration, and manipulate the third rotatable connection mechanism 166 to secure the fourth lock component 140 and the second device section 220 into the second configuration.

A different, non-rotational method to adjust the positions of the neighboring ones of the lock comments can involve loosening the spanning connection mechanism 164 securing the second and third lock components 120, 130 to each other at a first distance, adjusting the first distance to a second distance, and fastening the spanning connection mechanism 164 to secure the second and third lock components 120, 130 to each other at the second distance.

As explained above, when the lock mechanism 100 is in a non-rigid and unlocked position, adjacent ones of the lock components having a rotatable connection mechanism therebetween can rotate relative to each other in a range of angles. The adjacent ones of the lock components can be aligned with respect to each other at any of those angles and fastened into a rigid and locked position at one of those angles. Instead of each pair of the adjacent ones of the lock comments being lockable into only one, two, or a limited number of positions relative to each other, each pair of the adjacent ones of the lock components can be arranged to define either (i) any angle within the range of angles provided by the rotatable connection mechanism or (ii) any distance within a range of distances provided by a spacing element, thereby providing pairs of the adjacent ones of the lock components that are able to assume a large number of positions.

As the lock mechanism 100 can include several pairs of the adjacent ones of the lock components that are adjustably joined to each other (e.g., 110 and 120, 130 and 140, and 140 and 220), the lock mechanism 100 can be moved and secured into a large number of positions, such as dozens, hundreds, or even an infinite number of positions. As the distance between at least one pair of the adjacent ones of the lock, components (120 and 130) can be adjusted by the spanning connection mechanism 164, such pair can be positioned into any distance apart achievable by the spanning connection mechanism 164, and that pair can be locked into a rigid and secured position at any of those distances, for example, either touching each other or secured at a fixed distance apart from each other. Thus, the lock mechanism 100 can be locked into a rigid position in any configuration that its individual pieces can achieve.

As seen in FIG. 8 and FIG. 9, the first lock component 110 can secure the lock mechanism 100 to the first device section 210, for example, to a front corner of the first device section 210. The first lock component 110 can include a top surface member 32 for communicating with (i.e. contacting or abutting) a top surface of the first device section 210, a side surface member 34 for communicating with a side surface of the first device section 210, and a bottom surface member 36 for communicating with a bottom surface of the first device section 210. The top, side, and bottom surface members 32, 34, 36 of the first lock component 110 can be placed in close proximity to or flush with such corresponding sides of the first device section 210.

The top and side surface members 32, 34 of the first lock component 110 can be arranged at right or transverse angles relative to each other, and the side and bottom surface members 34, 36 of the first lock component 110 can be arranged at right or transverse angles relative to each other. However, embodiments disclosed herein are not so limited, and the surface members 32, 31, 36 of the first lock component 110 can be arranged at any angle relative to each other so that the first lock component 110 can be nestled around and outside of the top, side, and bottom surfaces of the first device section 210, thus conforming to exterior surfaces of the first device section 210, for example, as seen in FIG. 11.

As seen in FIG. 9 and FIG. 11, the side surface member 34 can include an elongated shaft 38 and an angled arm 40 contiguous with the elongated shaft 38. The elongated shaft 38 can be rectangular or any other shape that would be suitable for facing the side surface of the first device second 200, and the angled arm 40 can be rectangular or any other shape that would be suitable for facing the side surface of the first device section 200. A first end 42 of the angled arm 40 can contact and be attached to the top surface member 32 at a right or transverse angle, and a second, opposite end 44 can contact or be attached to the bottom surface member 36 at a right or transverse angle.

The top, side, and bottom surface members 32, 34, 36 of the first, lock component 110 can be rectangular or any other shape that would be suitable for facing the corresponding sides of the first device section 210. As seen in FIG. 9, these surface members can have an overall shape that is irregular. The front, side, and bottom surface members of the first lock component 110 can include one or more apertures 46 or cut-outs that can receive a variety of fastening mechanism to attach the lock mechanism 100 to the device 200.

Figure 12:
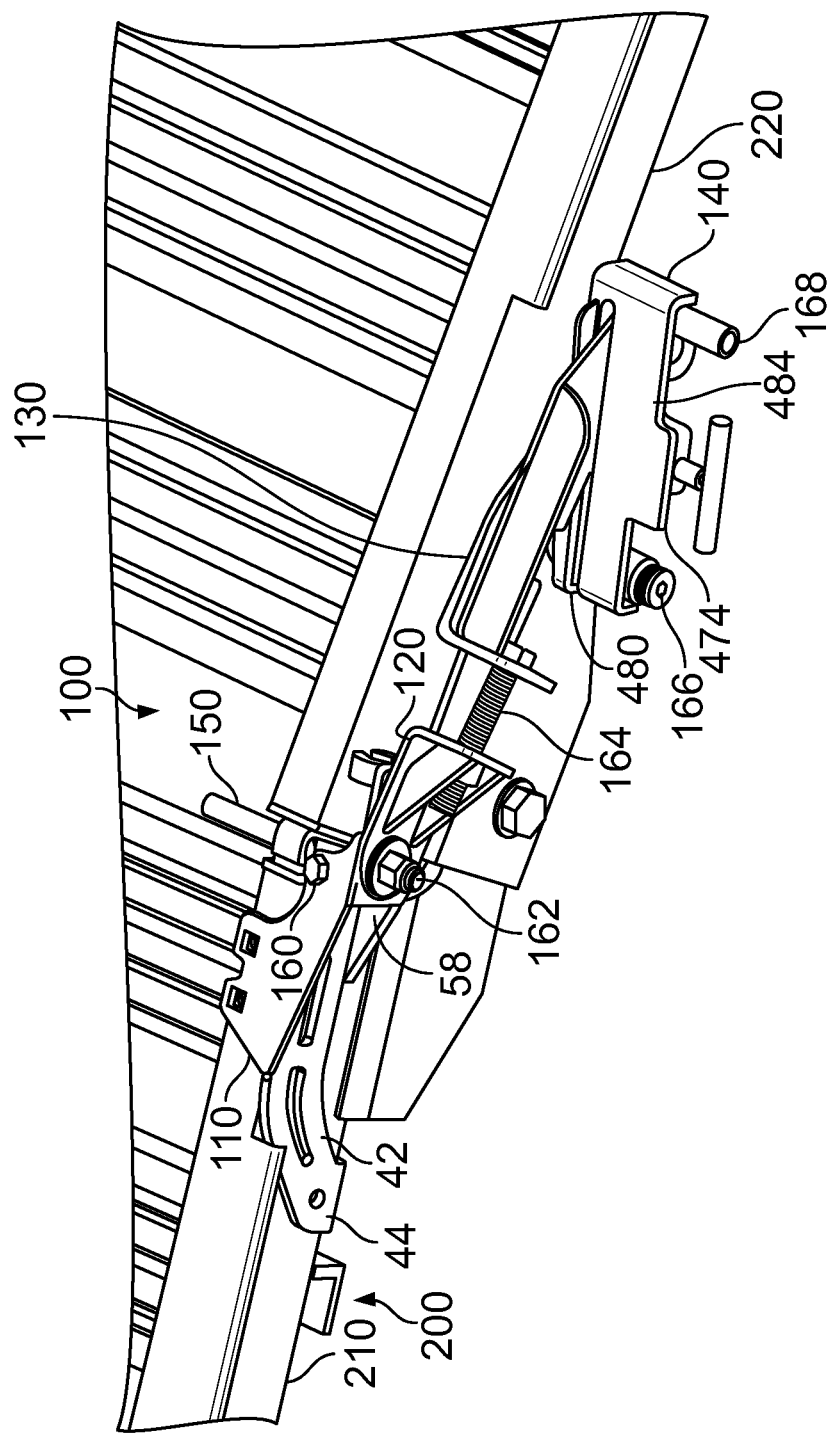
FIG. 12 is a top perspective view of a lock mechanism in accordance with disclosed embodiments securing sections of an apparatus relative to one another in a second position.

As shown in FIG. 12, when the first lock component 110 is positioned onto the first device section 210, a portion of the top surface member 32 can communicate with a portion of the top surface of the first device section 210. While a majority of the top surface member 32 can be flush with the first device section 210, a remaining portion 48 of the top surface member 32 can extend further than the top surface of the first device section 210 and past the side surface of the first device section 210.

A portion of the side surface member 34 can communicate with a portion of the side surface of the first device section 210. A portion of the bottom surface member 36 can communicate with a portion of the bottom surface of the first device section 210. The top, side, and bottom, surface members 32, 34, 36 of the first lock component 110 can be nestled around and outside of the top, side, and bottom surfaces of the first device section 210.

As seen in FIG. 11, the elongated shaft 38 can include a top edge 52 attached to the top surface member 32 and a bottom edge 54 opposite the top edge 52 and attached to a transverse platform 56. As best seen in FIG. 6, FIG. 7. FIG. 8, and FIG. 9, the transverse platform 56 can include a solid piece of material and can be attached at a right or transverse angle to the elongated shaft 38. An outer portion 58 of the transverse platform 56 can define an outline that conforms to an outline of a portion of the top surface member 32. As seen in FIG. 12, an edge of the outer portion 58 can define a plane that is parallel to a plane defined by an outer edge of the top surface member 32. As seen in FIG. 7 and FIG. 8, an inner portion 60 of the transverse platform 56 can have an edge or outline that mirrors an edge or outline of a portion of an inner edge of the top surface member 32.

The elongated shaft 38 can include a first flat side for facing the first device section 210 and a second flat side opposite the first flat side. Opposing apertures 46 can be disposed in corresponding ones of the first and second flat sides of the elongated shaft 38. The opposing apertures 46 can be suitable for receiving a fastener or connection mechanism therethrough. For example, the first rotatable connection mechanism 162 can be disposed in and through the opposing apertures 46 and/or in the elongated shaft 38. In some embodiments, the first rotatable connection mechanism 162 can extend past or through the first and second flat sides of the elongated shaft 38. Thus, the first rotatable connection mechanism 162 can be disposed to rotatably connect the first lock component 110 to the second lock component 120.

As seen in FIG. 1, FIG. 2, FIG. 3, and FIG. 4, the elongated shaft 38 can include an end portion 48 on an end distal from the angled arm 40, which can extend past the top surface of the first device section 210 and past the transverse platform 56 when the lock mechanism 100 is secured to the device 200.

The transverse platform 56 can be configured to define a plane that can be parallel to a plane defined by the top surface member 32. Each of the top surface member 32 and the transverse platform 56 cart include a first flat side for facing each other and a second, opposite flat side. Opposing apertures 46 can be disposed in corresponding ones of the first and second flat sides of the top surface member 32 and the transverse platform 56. The opposing apertures 46 can be suitable for receiving a fastener or connection mechanism therethrough, such as the first anchor mechanism 160. As seen in FIG. 7, in some embodiments, the first anchor mechanism 160 can extend past first and second sides of the top surface member 32 and the transverse platform 56, For example, a pin can be disposed in and through the apertures 46 and in the elongated shaft 38.

As seen in FIG. 7 and FIG. 8, the first anchor mechanism 160 can be disposed in or through the top surface member 32 and the transverse platform 56 for anchoring the first lock component 110 to the first device section 210. In some embodiments, the first anchor mechanism 160 can maintain the top and bottom surface members 32, 36 at a fixed distance therebetween. The first anchor mechanism 160 can be used to secure the first lock component 110 to the first device section 210.

The first anchor mechanism 160 can include a wedge assembly 150 attached to the top surface member 32 and the transverse platform 56. The wedge assembly 150 can have a wedge handle 152 for causing the wedge assembly 15I to rotate around an axis of rotation defined by the first anchor mechanism 160 in a direction indicated by the arrow in FIG. 7. A user can engage the wedge assembly 150 from a first, unsecured position (as seen in FIG. 7) to rotate to a second, secured position (as seen in FIG. 8 and FIG. 9) that can include at least a portion of the wedge assembly 150 being adjacent to an end of the first section 210 of the device 200 so that the portion of the wedge assembly 150 can be disposed between the first and second sections 210, 220 of the device 200.

The first anchor mechanism 160 can provide an axis of rotation for the wedge assembly 150 and can include a wedge handle 152 attached to the first anchor mechanism 160. The wedge handle 152 can include a cylindrical or generally flat extension member attached to a central portion 155 of the first anchor mechanism 160 that is located between the top surface member 32 and the transverse platform 56 of the first lock component 110. The wedge assembly can include a generally engagement 153 for engaging or communicating with a surface of the first device section 210. The engagement member 153 can be attached or connected to the wedge handle.

The side surface member 34 of the first lock component 110 can include a wedge handle receptacle 70 configured to receive and secure the wedge handle 152 when in one position. For example, as seen in FIG. 7 and FIG. 8, the elongated shaft 38 can include the wedge handle receptacle 70 on its interior surface (the surface facing the device 200 when the lock mechanism 100 engages the device 200).

The engagement member 153 can placed in close proximity or flush with a portion of the front surface of the first device section 210. The engagement member 153 can include a first flat side facing the device 200 and a second, opposite flat side communicating with a surface of the first device section 210. As seen in FIG. 7, when the front surface of the first device section 210 is flat, the engagement member 153 can be flat in a corresponding manner. It is envisioned that the engagement member 153 and the front surface of the first device section 210 will be shaped or configured to engage each other in the second position.

When the wedge assembly is in the second position, the first anchor mechanism 160 can communicate with a portion of the front surface of the first device section 210 and secure the first lock component 110 to the first device section 210 so that the top, side, and bottom surface members 32, 34, 36 of the first lock component 110 communicate with and lockingly engage the top, side, and bottom surfaces of the first device section 210.

As seen in FIG. 6 and FIG. 7, in some embodiments, the wedge assembly 150 can be spring loaded so that a spring is compressed when the wedge assembly 150 is in the second position and decompressed when the wedge assembly 150 is in the first position. Accordingly, the first lock component 110 can secure the wedge assembly 150 in the first position, and when released therefrom, the wedge assembly 150 can be biased for moving to the second position. The wedge assembly 150 can remain in the second position until user intervention causes the assembly 150 to move back to the first position and be secured by the first lock component 110.

As seen in FIG. 1, FIG. 2, FIG. 3, and FIG. 4, the second lock component 120 can include a first L-shaped arm member 74 that can include a first arm 76 connected or attached to a second arm 78 at a right or transverse angle to define an "L" shape. In some embodiments, the first and second arms 76, 78 can have the same length and width. As seen in FIG. 1, FIG. 3, and FIG. 6, in some embodiments, the first arm 76 can be located closest to the first lock component 110, the second arm 78 can be located closet to the third lock component 130, and the first arm 76 can have a greater length than the second arm 78. The first and second arms 76, 78 can be rectangular or any other shape that would be suitable for connection to the device 200 and can define a right angle or other angle.

The first arm 76 can include a first flat side for facing the device 200 and a second, opposite flat side. Opposing apertures 46 can be disposed in corresponding ones of the first and second sides of the first arm 76. The opposing apertures 46 can be suitable for receiving a fastener or connection mechanism therethrough. For example, the first rotatable connection mechanism 162 can be disposed in and through the apertures 46 and in the first arm 76, and the first rotatable connection mechanism 162 can be disposed in and through the apertures 46 and it the elongated shaft 38 to secure them together. In some embodiments, the first rotatable connection mechanism 162 can extend past first and second sides of the first arm 76. Thus, the first rotatable connection mechanism 162 can be disposed to rotatably connect the first and second lock components 110, 120 to each other.

As seen in FIG. 1, FIG. 2, FIG. 3, and FIG. 4, the first rotatable connection mechanism 162 can connect the first arm 76 to the elongated shaft 38. When the lock mechanism 100 is secured to the device 200, an end portion 48 of the elongated shat 38 can extend past the first rotatable connection mechanism 162.

The second arm 78 can include a first flat side for facing the second flat face of the first arm 76 and a second, opposite flat side. Opposing apertures 46 can be disposed in corresponding ones of the first and second sides of the second arm 78. The opposing apertures 46 can be suitable for receiving a fastener or connection mechanism therethrough. For example, the spanning connection mechanism 164 can be disposed in and through the corresponding apertures 46 and in the second arm 78. In some embodiments, the spanning connection mechanism 164 can extend past first and second sides of the second arm 78.

As seen in FIG. 3, FIG. 4, and FIG. 7, the first and second arms 76, 78 can include one or more reinforcement mechanisms 80 on inner surfaces thereof. Each of the reinforcement mechanisms 80 can include a solid piece of material extending between the first and second arms 76, 78 and can have a trapezoidal or other shape. The reinforcement mechanisms 80 can be flat or planar structures. Where there is a plurality of reinforcement mechanisms 80, they can be arranged to accommodate the placement of the spanning connection mechanism 164 with respect to the second tock component 120. For example, as seen in FIG. 14, FIG. 15, and FIG. 16, a pair of the reinforcement mechanisms 80 can be oriented parallel to each other so as to provide a channel 82 through which a portion of the spanning connection mechanism 164 can pass between. The reinforcement mechanisms 80 can be arranged to maximize the strength of the second lock component 120.

As seen in FIG. 1, the third lock component 130 can include a second L-shaped arm member 84, which can include a first arm 86 connected to a second arm 88 at a right or transverse angle to define an "L" shape. In some embodiments, the first and second arms 86, 88 can have the same length and width. As seen in FIG. 1 and FIG. 6, in some embodiments, the first arm 86 can be located closest to the second lock component 120, the second arm 88 can be located closest to the fourth lock component, and the first arm 86 can have a shorter length than the second arm 88. The first and second arms 86, 88 can be rectangular or any other shape that would be suitable for connection to the device and can define a right angle or other angle.

The first arm 86 can include a first flat side for facing the second arm 78 of the second lock component 120 and a second, opposite flat side. Opposing apertures 46 can be disposed in corresponding ones of the first and second sides of the first arm 86. In some embodiments, the opposing apertures 46 can be suitable for receiving a fastener or connection mechanism therethrough. For example, the spanning connection mechanism 164 can be disposed in and through the corresponding apertures 46 and in the first arm 86 of the third lock mechanism 130. In some embodiments, the spanning connection mechanism 164 can extend past first and second sides of the first arm 86.

As seen in FIG. 1, the second and third lock components 120, 130 can connect to each other via a fastener or connection mechanism, such as the spanning connection mechanism 164. For example, the spanning connection mechanism 164 can include a bolt and a screw, and the bolt can be threaded along a length of the screw to adjust a distance between the second and third lock components 120, 130. In some embodiments, a user can adjust tension between the second and the third lock components 120, 130, thereby adjusting a locking pressure of the spanning connection mechanism 164 and adjusting the distance between the second and third lock components.

As seen in FIG. 1, FIG. 2, and FIG. 3, the spanning connection mechanism 164 can be disposed in and threaded through the corresponding apertures 46 of the second arm 78 of the second lock component 120 and the corresponding apertures 46 of the first arm 86 of the third lock component 130 to adjustably connect the second and third lock components 120, 130 to each other. The spanning connection mechanism 164 can lock the second and third lock components 120, 130 in contact with each other or secure them at any one of a plurality of fixed distances from each other.

For example, as seen in FIG. 3, when the spanning connection mechanism 164 secures the second and third lock components 120, 130 to each other, the spanning connection mechanism 164 can define a longitudinal axis parallel to a central longitudinal axis of the first arm 76 of the second lock component 120 and parallel to a central longitudinal axis of the second arm 88 of the third lock component 130.

As can be seen, in FIG. 1, FIG. 4, and FIG. 11, the first and second arms 86, 88 can include the one or more reinforcement mechanisms 80 on the inner surfaces thereof extending between and connecting the first and second arms 86, 88.

The second arm 88 can include a first flat side for facing the second flat face of the first arm and a second, opposite flat side for facing the device 200. Opposing apertures 46 can be disposed in corresponding ones of the first and second sides of the second arm 88. The opposing apertures 46 can be suitable for receiving a fastener or connection mechanism therethrough. For example, the second rotatable connection mechanism 168 can be disposed in and through the apertures 46 and in the second arm 88. In some embodiments, the second rotatable connection mechanism 168 can extend past first and second sides of the second arm 88.

The second arm 88 can include a groove or track 90 for engaging the third rotatable connection mechanism 166 of the fourth lock component 140. The track 90 can be located in a central portion of the second arm 88 and can be located proximate to the first arm 86. As seen in FIG. 11, the track 90 can define a U-shaped channel and can extend from a first edge of the first arm toward a second, opposing edge, but terminate before reaching the second edge. As seen in FIG. 11, the track 90 can extend in a straight line from an edge of the second arm 88 facing the fourth lock component 140. The track 90 can define a path perpendicular to a central longitudinal axis of the second arm 88 or perpendicular to one of the reinforcing mechanisms 80. A path of the track 90 can define a line parallel to the first arm 86 of the third lock component 130 or a line that is angled, arcing, irregular in shape, or branched.

As seen in FIG. 14, FIG. 15, and FIG. 16, the fourth lock component 140 can include a C-shaped bracket 472 that includes a central segment 474 flanked on opposite ends by first and second end segments 476, 478. The central segment 474 can be elongated such that each the end segments 476, 478 can be shorter than the central segment 474. As seen in FIG. 16, the end segments 476, 478 can extend from the central segment 474 an equal distance.

The central segment 474 can include a first flat side and a second, opposite flat side. As seen in FIG. 14 a first end of a slot 480 can be positioned proximate to the first end segment 476 with the slot 480 running through a central portion of the central segment 474 and extending toward the second end segment 478. It is preferred that the slot 480 have a width that is gr-ater than a thickness of the second arm 88 of the third lock component 130. As seen in FIG. 12 and FIG. 13, in some embodiments, the slot 480 can be configured so that a portion of the second arm 88 can slide through the slot 480. The slot 480 can extend to the second end segment 478.

The third lock component 130 can be configured so that a portion of the second arm 88 can pass through the slot 480. The second arm 88 of the third lock component 130 can include a reinforcing mechanism attached at a transverse angle to the second arm 88 such that the reinforcing mechanism 80 can be positioned to contact a first, upper side 484 of the central segment 474 of the fourth lock component 140. An opposite, lower side 486 of the central segment 474 can contact the second and third rotatable connection mechanisms 168, 166 proximate to junctions of the central segment 474 with the second and first end segments 478, 476. That is, each of the rotatable connection mechanisms can define an axis of rotation parallel to a junction of the central segment 474 and an end segment (such as 476 or 478).

As seen in FIG. 11 and FIG. 12, the second rotatable connection mechanism 168 can be located proximate to the junction of the central segment 474 and the first end segment 476 (the end segment furthest from the first kick component 110). The third rotatable connection mechanism 166 can be located proximate to the junction of the central segment 474 and the second end segment 478 (the end segment closest to the first lock component 110). Each of the second and third rotatable connection mechanisms 168, 166 can form an axis of rotation for the fourth lock component 140 to move in a rotating fashion with respect to another structure, such as the third lock component 130 and the second section of the device 220, respectively.

The central segment 474 can be attached to an attachment mechanism 482 extending between the central segment 474 and an end of the C-shaped bracket 472, preferably between the central segment 474 and the first end segment 476 of the C-shaped bracket 472. As seen in FIG. 11, the attachment mechanism 482 can include, for example, a solid piece of material having a first flat side for facing toward the device 200 and a second, opposite flat side facing away from the device. For example, opposing apertures 46 can be disposed in corresponding ones of the first and second sides of the attachment mechanism 482. The opposing apertures 46 can be suitable for receiving a fastener or connection mechanism therethrough. The second rotatable connection mechanism 168 can be disposed in and through the corresponding apertures 46 and in the attachment mechanism 482. In some embodiments, the second rotatable connection mechanism 168 can ex-tend past first and second sides of the attachment mechanism 482. The corresponding apertures 46 in the third and fourth lock components 130, 140 or overlapping portions of the third and fourth lock components 130, 140 can be aligned to accept the second rotatable connection mechanism 168 so as to facilitate rotational movement between the third and fourth lock components 130, 140 at that location.

Thus, the second rotatable connection mechanism 168 can be rotatably connected to the third and fourth lock components 130, 140. As seen in FIG. 11 and FIG. 12, the second rotatable connection mechanism 168 can join or connect the second arm 88 of the third lock component 130 to the attachment mechanism 482 of the fourth lock component 140.

The fourth lock component 140 can be disposed for communicating with the third rotatable connection mechanism 166 proximate to the junction of the central segment 474 and the second end segment 478 (the end segment closest to the first lock component 110). The third rotatable connection mechanism 166 can provide an axis of rotation between the fourth lock component 140 and the second section of the device 220, thereby rotatably connecting those structures to each other.

As seen in FIG. 1, FIG. 4, and FIG. 12, the central segment 474 can include one or more reinforcement mechanisms 80 proximate to and running adjacent to the slot 480. The reinforcement mechanisms 80 can extend upward and outward from the upper side 484 of the central segment 474 and generally parallel a surface of the first device section 210. In some embodiments, the reinforcement mechanisms 80 can run along an entire length of the slot 480. As seen in FIG. 11 and FIG. 12, in some embodiments, the reinforcement mechanisms 80 can have a length shorter than a length of the slot 480. When the second arm 88 of the third lock component 130 moves through the slot 480, the second arm 88 can move in close proximity to or flush with the reinforcement mechanisms 80 of the fourth lock component 140. It is preferred that the reinforcement mechanisms 80 of neighboring ones of the lock components be disposed so as not to contact each other when the neighboring ones of the lock components are moved with respect to each other.

As seen in FIG. 9, FIG. 10, FIG. 11, and FIG. 12, when the fourth lock component 140 is in communication with the second device section 220, the third rotatable connection mechanism 166 can join or connect those elements together. As seen in FIG. 12, when the lock mechanism 100 is secured to the device 200, the second, third, and fourth lock components 120, 130, 140 can be disposed so as to be flush with an outer side of the second device section 220.

In some embodiments, the fourth lock component 140 can include a spring loaded pin lock 142 that can be engaged to lock the lock mechanism 100 and secure the third lock component 130 to the fourth lock component 140 and/or secure the fourth lock component 140 to the second section 220 of the device 200 and that can be disengaged to unlock the lock mechanism 100 and to release the third lock component 130 from the fourth lock component 140 and/or to release the fourth lock component 140 from the second section 220 of the device 200.

To secure the first and second device sections 210, 220 relative to one another, the pin lock 142 can be engaged so that the third tock component 130 is secured relative to the fourth lock component 140 and/or so that the fourth lock component is secured relative to the second device section 220. To unlock the lock mechanism 100, a user can disengage the pin lock 142 by pulling on the pin lock 142. In some embodiments, the pin lock 142 can be spring loaded.

When the pin lock 142 is disengaged, the third lock component 130 can rotate relative to the fourth lock component 140 about the axis of rotation defined by the second rotatable connection mechanism 168. As seen in FIG. 4 and FIG. 5, as the third lock component 130 rotates relative to the fourth lock component 140 and as the second lock component 120 rotates relative to the first lock component 110, the second device section 220 can rotate relative to the first device section 210.

In some embodiments, the user can also engage the pin lock 142 to lock the lock mechanism 100. Furthermore, in some embodiments, the user can adjust the spanning connection mechanism 164 as needed to adjust the tension between the second lock component 120 and the third lock component 130, thereby adjusting a locking pressure of the lock mechanism 100. For example, the spanning connection mechanism 164 can include a bolt and a screw, and the bolt can be threaded along a length of the screw to adjust a distance between the second locking mechanism 120 and the third locking mechanism.

From the foregoing, it will be observed that numerous variations and modifications may be effected without departing from the spirit and scope of the invention. It is to be understood that no limitation with respect to the specific apparatus or method illustrated herein is intended or should be inferred. It is, of course, intended to cover by the appended claims all such modifications as fall within the scope of the claims.

What is claimed is:

1. A lock mechanism comprising:
a plurality of interconnected assemblies configured to couple to and rotate with respect to a first section and a second section of an apparatus;
a first contact point included on one of the plurality of interconnected assemblies; and
a second contact point included on another one of the plurality of interconnected assemblies that engages with the first contact point when the plurality of interconnected assemblies are arranged in a first locking configuration and a second locking configuration different from the first locking configuration,
wherein the first contact point disengages from the second contact point when the plurality of interconnected assemblies are arranged somewhere between the first locking configuration and the second locking configuration.

2. The lock mechanism of claim 1 wherein the first locking configuration corresponds to a first position of the first section and the second section, wherein the second locking configuration corresponds to a second position of the first section and the second section, and wherein the first position is different from the second position.

3. The lock mechanism of claim 2 wherein the second section is approximately parallel to the first section when in the first position, and wherein the second section is approximately in line with the first section when in the second position.

4. The lock mechanism of claim 1 wherein the plurality of interconnected assemblies includes:
a first assembly configured to coupled to the first section;
a second assembly rotatably coupled to the first assembly;
a third assembly coupled to the second assembly and including the first contact point;
a connecter that couples the second assembly an offset distance from the third assembly, wherein the connector is configured to vary the offset distance so as to adjust a tension force between the second assembly and the third assembly; and
a fourth assembly that includes the second contact point, is coupled the third assembly, and is configured to rotatably couple to the second section,
wherein the second assembly and the third assembly rotate together with respect to the first assembly and the fourth assembly and the fourth assembly rotates with respect to the second assembly and the third assembly so as to engage and disengage the first contact point and the second contact point based on whether the plurality of interconnected assemblies are positioned in one of the first locking configuration, the second locking configuration, and somewhere between the first locking configuration and the second locking configuration.

5. The lock mechanism of claim 4 wherein the first contact point is positioned at a central location on the third assembly between a first location where the third assembly is coupled to the connector and a second location where the third assembly is rotatably coupled to the fourth assembly.

6. The lock mechanism of claim 5 wherein the central location includes a cutout region configured to receive the portion of the fourth assembly that includes the second contact point.

7. The apparatus of claim 4 further comprising a wedge rotatably coupled to the first assembly and configured to rotate into a wedging position that is configured to block the first section and the second section from rotating from a first position associated with the first locking configuration into a second position associated with the second locking configuration.

8. An apparatus comprising:
a first section;
a second section rotatably coupled to the first section and configured to rotate between a first position relative to the first section and a second position relative to the first section;
a lock mechanism coupled to the first section and the second section and that includes a first contact point that engages with a second contact point of the lock mechanism when the second section is in the first position and the second position and that disengages with the second contact point when the second section is rotationally between the first position and the second position,
wherein, when the second section is in the first position, a first holding force secures the second section in the first position until the first holding force is overcome, and
wherein, when the second section is in the second position, the engagement of the first contact point with the second contact point supplies a second holding force that secures the second section in the second position until the second holding force is overcome.

9. The apparatus of claim 8 wherein the second section is approximately parallel to the first section when in the first position, and wherein the second section is approximately in line with the first section when in the second position.

10. The apparatus of claim 8 wherein the lock mechanism is rotatably coupled to the first section at a first location and rotatably coupled to the second section at a second location different from the first location, and wherein the lock mechanism rotates with respect to both the first section and the second section so as to engage and disengage the first contact point and the second contact point based on whether the second section is positioned in one of the first position, the second position, and somewhere between the first position and the second position.

11. The apparatus of claim 8 wherein the lock mechanism includes a first assembly rotatably coupled to the first section and a second assembly rotatably coupled to the second section, wherein the second assembly is rotatably coupled to the first assembly, and wherein the first assembly rotates with respect to the first section and the second assembly and the second assembly rotates with respect to the second section and the first assembly so as to engage and disengage the first contact point and the second contact point based on whether the second section is positioned in one of the first position, the second position, and somewhere between the first position and the second position.

12. The apparatus of claim 8 wherein the lock mechanism includes:
a first assembly coupled to the first section;
a second assembly rotatably coupled to the first assembly;
a third assembly coupled to the second assembly and including the first contact point;
a connecter that couples the second assembly an offset distance from the third assembly, wherein the connector is configured to vary the offset distance so as to adjust a tension force between the second assembly and the third assembly; and
a fourth assembly rotatably coupled to the second section and the third assembly and including the second contact point,
wherein the second assembly and the third assembly rotate together with respect to the first section, the first assembly, and the fourth assembly and the fourth assembly rotates with respect to the second section, the second assembly, and the third assembly so as to engage and disengage the first contact point and the second contact point based on whether the second section is positioned in one of the first position, the second position, and somewhere between the first position and the second position.

13. The apparatus of claim 12 wherein the first contact point is positioned at a central location on the third assembly between a first location where the third assembly is coupled to the connector and a second location where the third assembly is rotatably coupled to the fourth assembly.

14. The apparatus of claim 13 wherein the central location includes a cutout region configured to receive the portion of the fourth assembly that includes the second contact point.

15. The apparatus of claim 12 wherein the lock mechanism further includes a wedge rotatably coupled to the first assembly and configured to rotate into a wedging position between the first section and the second section, wherein, when the wedge is positioned in the wedging position, the wedge blocks the second section from rotating into the second position from the first position.

16. The apparatus of claim 12 further comprising a pin lock that when engaged supplies the first holding force by releasably joining the third assembly to the fourth assembly and wherein overcoming the first holding force includes disengaging the pin lock.

17. The apparatus of claim 8 further comprising a wedge rotatably coupled to the lock mechanism and configured to rotate into a wedging position between the first section and the second section, wherein, when the wedge is positioned in the wedging position, the wedge blocks the second section from rotating into the second position from the first position.

18. The apparatus of claim 8 further comprising a pin lock that when engaged supplies the first holding force by releasably joining the lock mechanism to the second section, and wherein overcoming the first holding force includes disengaging the pin lock.

19. The apparatus of claim 8 wherein, when the second section is in the first position, the engagement of the first contact point with the second contact point supplies the first holding force to secure the second section in the first position until the second holding force is overcome.

20. The apparatus of claim 8 wherein the first contact point is included within a cutout region of the lock mechanism that is configured to receive a portion of the lock mechanism that includes the second contact point.

\* \* \* \* \*